United States Patent
Laitinen et al.

(10) Patent No.: US 9,300,641 B2
(45) Date of Patent: Mar. 29, 2016

(54) METHOD AND APPARATUS FOR PROVIDING BOOTSTRAPPING PROCEDURES IN A COMMUNICATION NETWORK

(75) Inventors: Pekka Laitinen, Helsinki (FI); Philip Ginzboorg, Espoo (FI); Nadarajah Asokan, Espoo (FI); Gabor Bajko, San Diego, CA (US)

(73) Assignee: Nokia Corporation, Helsinki (FI)

( * ) Notice: Subject to any disclaimer, the term of this patent is extended or adjusted under 35 U.S.C. 154(b) by 2270 days.

(21) Appl. No.: 11/352,058

(22) Filed: Feb. 10, 2006

(65) Prior Publication Data

US 2006/0182280 A1    Aug. 17, 2006

Related U.S. Application Data

(60) Provisional application No. 60/652,235, filed on Feb. 11, 2005, provisional application No. 60/671,621, filed on Apr. 15, 2005, provisional application No. 60/651,620, filed on Feb. 11, 2005.

(51) Int. Cl.
*H04L 29/06* (2006.01)
*H04W 12/04* (2009.01)
*H04W 12/06* (2009.01)

(52) U.S. Cl.
CPC ............ *H04L 63/06* (2013.01); *H04L 63/0807* (2013.01); *H04W 12/04* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 5,615,267 A * | 3/1997 | Lin | ........................ | H04W 12/06 380/247 |
| 6,836,765 B1 * | 12/2004 | Sussman | ................ | G06Q 20/02 705/75 |
| 6,985,953 B1 * | 1/2006 | Sandhu | ............... | G06F 17/3089 709/225 |

(Continued)

FOREIGN PATENT DOCUMENTS

WO    PCT/IB2006/000272    6/2006

OTHER PUBLICATIONS

Amir, Yair; Nita-Rotaru, Cristina; Stanton, Jonathan; Tsudik, Gene. Scalling Secure Group Communication Systems: Beyond Peer-to-Peer. Proceedings, 2003 DARPA Information Survivability Conference and Exposition. vol. 1. Relevant pp. 226-237. http://ieeexplore.ieee.org/stamp/stamp.jsp?tp=&arnumber=1194887.*

(Continued)

*Primary Examiner* — Dede Zecher
*Assistant Examiner* — Jeremiah Avery
(74) *Attorney, Agent, or Firm* — Ditthavong & Steiner, P.C.

(57) ABSTRACT

An approach is provided for performing authentication in a communication system. In one embodiment, a key is established with a terminal in a communication network according to a key agreement protocol. The agreed key is tied to an authentication procedure to provide a security association that supports reuse of the key. A master key is generated based on the agreed key. In another embodiment, digest authentication is combined with key exchange parameters (e.g., Diffie-Hellman parameters) in the payload of the digest message, in which a key (e.g., SMEKEY or MN-AAA) is utilized as a password. In yet another embodiment, an authentication algorithm (e.g., Cellular Authentication and Voice Encryption (CAVE)) is employed with a key agreement protocol with conversion functions to support bootstrapping.

14 Claims, 17 Drawing Sheets

(56) References Cited

U.S. PATENT DOCUMENTS

| | | | |
|---|---|---|---|
| 7,046,647 B2 * | 5/2006 | Oba | H04L 63/08 370/331 |
| 7,047,405 B2 * | 5/2006 | Mauro | G06Q 20/367 380/270 |
| 7,139,917 B2 * | 11/2006 | Jablon | H04L 9/0844 713/183 |
| 7,181,620 B1 * | 2/2007 | Hur | H04L 9/083 713/168 |
| 7,398,550 B2 * | 7/2008 | Zick | H04L 63/0853 726/5 |
| 7,549,048 B2 * | 6/2009 | Freeman | G06F 21/31 713/171 |
| 2002/0146129 A1 * | 10/2002 | Kaplan | G06F 17/30905 380/270 |
| 2003/0211842 A1 | 11/2003 | Kempf et al. | |
| 2004/0098588 A1 | 5/2004 | Ohba et al. | |
| 2007/0055870 A1 * | 3/2007 | Bruti | H04L 9/0833 713/168 |

OTHER PUBLICATIONS

Kambourakis, Georgios; Rouskas, Angelos; Gritzalis, Stefanos. Using SSL/TLS in Authentication and Key Agreement Procedures of Future Mobile Networks. 4th International Workshop on Mobile and Wireless COmmunications Network. Pub. Date: 2002. Relevant pp. 152-156. http://ieeexplore.ieee.org/stamp/stamp.jsp?tp=&arnumber=1045713.*

Balfanz, Dirk; Durfee, Glenn; Shankar, Narendar; Smetters, Diana; Staddon, Jessica; Wong, Hao-Chi. Secret Handshakes from Pairing-Based Key Agreements. Proceedings, 2003 Symposium on Security and Privacy. Relevant pp. 180-196. http://ieeexplore.ieee.org/stamp/stamp.jsp?tp=&arnumber=1199336.*

Z. Fu et al., "ISCP: Design and Implementaion of an Inter-Domain Security Management Agent (SMA) Coordination Protocol," 2000, Session 14, Security Management (I).

Chinese Office Action of Corresponding Chinese Patent Application No. 200680011633.6 dated Mar. 11, 2010, China, pp. 1-7.

* cited by examiner

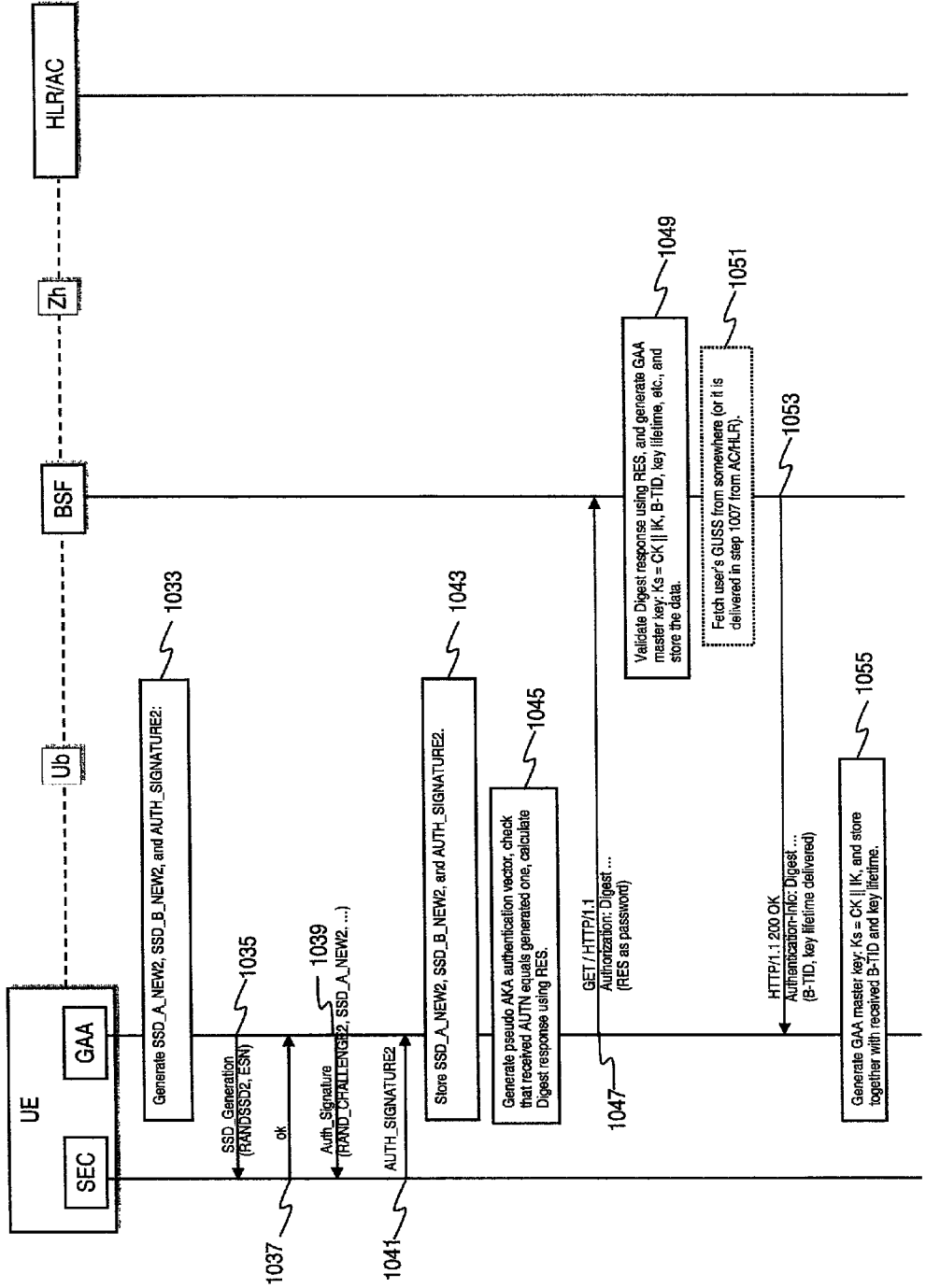

METHOD AND APPARATUS FOR PROVIDING BOOTSTRAPPING PROCEDURES IN A COMMUNICATION NETWORK

RELATED APPLICATIONS

This application claims the benefit of the earlier filing date under 35 U.S.C. §119(e) of U.S. Provisional Application Ser. No. 60/652,235 filed Feb. 11, 2005, entitled "Method and Apparatus For Supporting Authentication in a Radio Communication System," U.S. Provisional Application Ser. No. 60/671,621 filed Apr. 15, 2005, entitled "Method and Apparatus For Bootstrapping in a Radio Communication System," and U.S. Provisional Application Ser. No. 60/651,620 filed Feb. 11, 2005, entitled "Using GAA in Legacy CDMA Networks"; the entireties of which are incorporated by reference.

FIELD OF THE INVENTION

The invention relates to communications and more particularly, to providing authentication services in a communication system.

BACKGROUND OF THE INVENTION

Radio communication systems, such as cellular systems (e.g., spread spectrum systems (such as Code Division Multiple Access (CDMA) networks), or Time Division Multiple Access (TDMA) networks), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One key area of effort involves authentication. Authentication plays an important role in any communication system to ensure that communication is established between proper users or applications. Unfortunately, implementation of such standards may require modification of other protocols, which may be cost prohibitive, even if technically achievable.

Therefore, there is a need for an approach to provide authentication services without requiring altering of extant standard protocols or development of new protocols.

SUMMARY OF THE INVENTION

These and other needs are addressed by the invention, in which an approach is presented for more effectively performing initial authentication (bootstrapping) in a communication network.

According to one aspect of an embodiment of the invention, a method for authenticating comprises establishing a key with a terminal in a communication network according to a key agreement protocol, wherein the terminal is configured to operate using spread spectrum. The method also comprises tying the agreed key to an authentication procedure to provide a security association that supports reuse of the key. Further, the method comprises generating a master key based on the agreed key.

According to another aspect of an embodiment of the invention, a method for authenticating comprises establishing a shared key with a network element in a communication network according to a key agreement protocol, wherein the network element is configured to tie the agreed key to an authentication procedure to provide a security association that supports reuse of the key. The method also comprises generating a master key based on the agreed key.

According to another aspect of an embodiment of the invention, an apparatus for authenticating comprises an authentication module configured to establish a shared key with a network element in a communication network according to a key agreement protocol, wherein the network element is configured to tie the agreed key to an authentication procedure to provide a security association that supports reuse of the key, the authentication module being further configured to generate a master key based on the agreed key.

According to another aspect of an embodiment of the invention, a method for authenticating comprises generating a message for authenticating communication with a network element configured to perform bootstrapping. The method also comprises setting a password field of the message to a function of a secret key, wherein the secret key is encrypted; and specifying key establishment information within a payload of the message, wherein the message is transmitted according to a transport protocol for accessing information over a data network.

According to another aspect of an embodiment of the invention, a method for authenticating comprises receiving a message from a terminal, according to a transport protocol for accessing information over a data network, requesting authentication, wherein the message includes a password field that is a function of a secret key and a payload containing key establishment information specifying parameters for determining another secret key. The method also comprises generating a master key based on the secret key.

According to another aspect of an embodiment of the invention, an apparatus for authenticating comprises an authentication module configured to generate a message for authenticating communication with a network element configured to perform bootstrapping, and to set a password field of the message to be a function of a secret key, wherein the secret key is encrypted. The message has a payload that includes new key establishment information. The message is transmitted according to a transport protocol for accessing information over a data network.

According to another aspect of an embodiment of the invention, a method for authenticating comprises receiving an authentication request specifying a user identity from a terminal. The method also comprises forwarding the user identity to a location register configured to generate, based on the user identity, cryptographic parameters including a random secret data, and a secret data generated from the random secret data according to a cryptographic algorithm. Additionally, the method comprises receiving the generated cryptographic parameters from the location register. The method also comprises generating an authentication vector by converting the cryptographic parameters to key parameters including an authenticating token and an authentication response; and transmitting the authenticating token to a terminal configured to output the authentication vector. Further, the method comprises validating an authentication response from the terminal using the authentication response from the authentication vector; and generating a master key based on the key parameters.

According to another aspect of an embodiment of the invention, a method for authenticating comprises generating an authentication request specifying a user identity. The method also comprises transmitting the authentication request to a network element configured to provide bootstrapping, wherein the network element forwards the user identity to a location register configured to generate, based on the user identity, cryptographic parameters including a random secret data, and a secret data generated from the random secret data according to a cryptographic algorithm. The network element generates an authentication vector by converting the cryptographic parameters to key parameters including an authenticating token and an authentication response. Additionally, the method comprises receiving the authenticating token from the network element; and outputting the authentication response based on the authenticating token. Further, the method comprises determining a digest response using the authentication response; transmitting the digest response to the network element for validation; and generating a master key based on the key parameters.

According to yet another aspect of an embodiment of the invention, an apparatus comprises an authentication module configured to generate an authentication request specifying a user identity. The apparatus also comprises a transceiver configured to transmit the authentication request to a network element configured to provide bootstrapping, wherein the network element forwards the user identity to a location register configured to generate, based on the user identity, cryptographic parameters including a random secret data, and a secret data generated from the random secret data according to a cryptographic algorithm. The network element generates an authentication vector by converting the cryptographic parameters to key parameters including an authenticating token and an authentication response. The transceiver is further configured to receive the authenticating token from the network element, and the authentication module is further configured to output the authentication vector based on the authenticating token, to determine a digest response using the authentication response, and to generate a master key based on the key parameters upon validation of the digest response by the network element.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The invention is illustrated by way of example, and not by way of limitation, in the figures of the accompanying drawings in which like reference numerals refer to similar elements and in which:

FIGS. 10A and 10B are diagrams of a bootstrapping procedure utilizing CAVE with multiple SSDs, according to an embodiment of the invention;

DESCRIPTION OF THE PREFERRED EMBODIMENT

An apparatus, method, and software for providing bootstrapping in a communication system are described. In the following description, for the purposes of explanation, numerous specific details are set forth in order to provide a thorough understanding of the invention. It is apparent, however, to one skilled in the art that the invention may be practiced without these specific details or with an equivalent arrangement. In other instances, well-known structures and devices are shown in block diagram form in order to avoid unnecessarily obscuring the invention.

Figure 1:
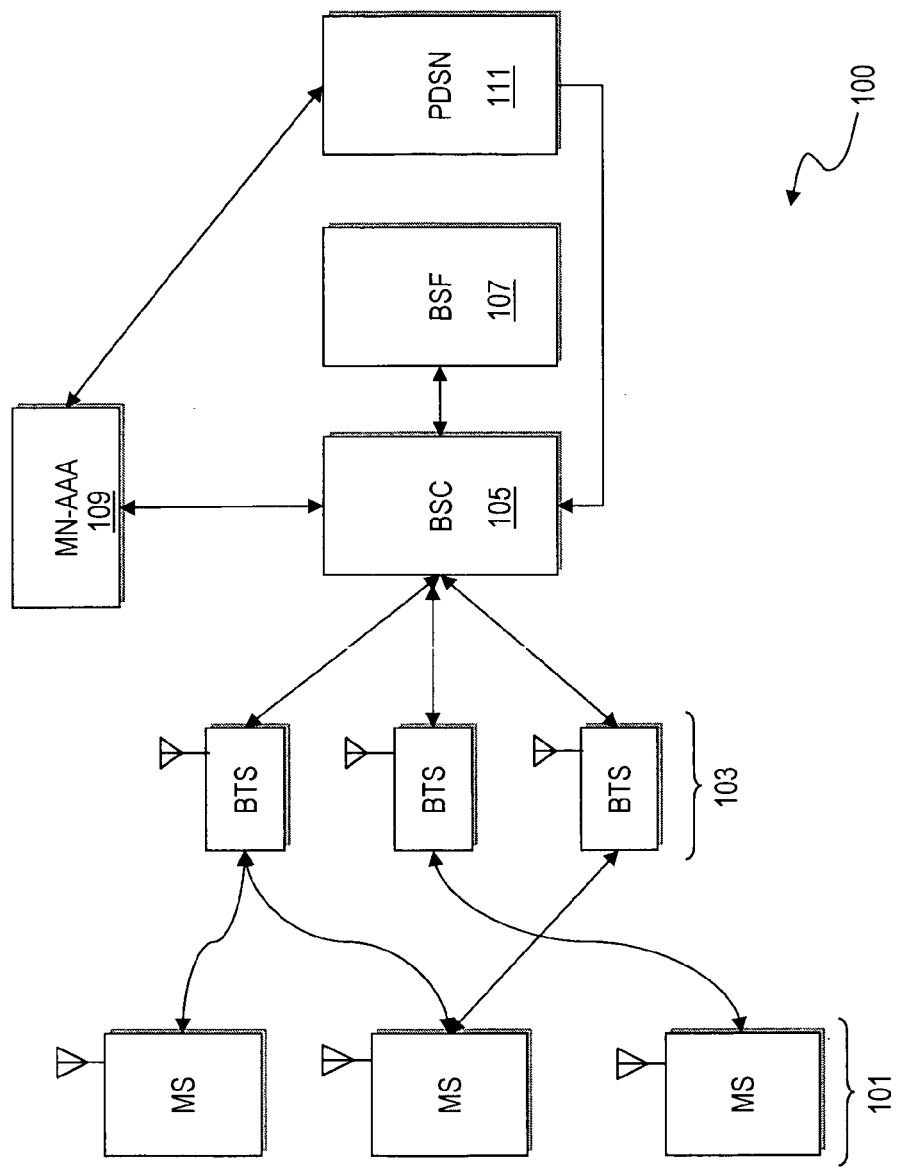
FIG. 1 is a diagram of a radio communication system for supporting a Generic Authentication Architecture (GAA), in accordance with various embodiments of the invention.

FIG. 1 is a diagram of a radio communication system for supporting a Generic Authentication Architecture (GAA), in accordance with various embodiments of the invention. Although the invention is discussed with respect to a radio communication system using spread spectrum technology, it is recognized by one of ordinary skill in the art that various aspects of the invention have applicability to any type of transport network, including wireless systems and wired systems. Also, various embodiments of the invention are described with respect to Diffie-Hellman and HyperText Transfer Protocol (HTTP); however, it is contemplated that other equivalent key exchange protocols and communication protocols that support transfer of representation of resources can be used in practicing the invention.

Initial authentication (i.e., bootstrapping) of Third Generation Project Partnership (3GPP) Generic Authentication Architecture (GAA) is based on AKA (Authentication and Key Agreement Protocol). Typically, authentication in CDMA 2000 (Code Division Multiple Access 2000) networks is based on CAVE (Cellular Authentication and Voice Encryption) algorithm, while authentication in CDMA 1× EvDo (Evolution Data only) is based on CHAP (Challenge Handshake Authentication Protocol). For CDMA networks (e.g., CDMA 2000 1× Revision C and subsequent revisions), AKA has been adopted by the Third Generation Project Partnership 2 (3GPP2).

Communication system 100 includes one or more mobile stations (MSs) 101 configured to communicate with one or more base station transceiver subsystems (BTSs) 103. The BTSs 103, in turn, is served by a base station controller (BSC) 105, which operates with a network element capable providing a Bootstrapping Server Function (BSF) 107. The system 100 also includes a Mobile Node Authentication, Authorization and Accounting Service (MN-AAA) 109, which communicates with a Packet Data Serving Node (PDSN) 111.

The system 100, according to one embodiment, provides 3GPP generic authentication architecture functionality in CDMA Ev-Do networks. In particular, a bootstrapping mechanism entails establishing a GAA master secret between an MS 101 and the BSF 107. This master secret, in an exemplary embodiment, is tied to the Challenge Handshake Authentication Protocol (CHAP) based authentication procedure. According to one embodiment of the invention, one such key agreement (i.e., key exchange) method is Diffie-Hellman. This method is further described in Internet Engineering Task Force (IETF) Request For Comment (RFC) 2631, which is incorporated herein by reference in its entirety.

In CDMA 1× EvDo networks, for example, the MS 101 is authenticated using CHAP, which is specified in IETF RFC 1994 (which is incorporated herein by reference in its entirety). In the defined CHAP procedure, the network element, PDSN 111, sends a challenge to the MS 101, which calculates a response based on the received challenge and a subscriber specific secret that is stored in the 101 MS. The response is sent back to the PDSN 111 together with the subscriber identity. The PDSN 111 forwards the received response and the identity together with the challenge that the PDSN 111 earlier sent to the MS 101 to the MN-AAA 109.

The MN-AAA 109 locates the subscriber specific secret using the identity and verifies that the response sent by the MS 101 equals the response value that the MN-AAA 109 calculated. Depending on the outcome of this verification, the MN-AAA 109 returns either success or failure indication to the PDSN 111. If the PDSN 111 receives a success message, the MS 101 has successfully been authenticated.

It is recognized that the authentication procedure used in CDMA 1× EvDo networks cannot be used directly for GAA because the secret is only known by the MS and the MN-AAA (analogous to Home Subscriber System (HSS) in GAA). Hence, the Bootstrapping Server Function (BSF) (which acts like a PDSN) cannot derive a GAA master key from this CHAP secret as the MN-AAA (analogous to Home Subscriber System (HSS) in GAA architecture) does not provide this secret.

According to an exemplary embodiment, after the key has been agreed between the MS 101 and the BSF 107, the BSF 107 ties the key agreement procedure to the CHAP authentication by deriving the CHAP challenge from the key agreement procedure. A number of approaches can be utilized, according to various embodiments of the invention, to tie the key agreement procedure to CHAP. First, the BSF 107 may derive the challenge from the agreed key. Second, the BSF 107 also derives the challenge from the key agreement messages that were transferred between the BSF 107 and the MS 101. Third, for example, if a Diffie-Hellman key agreement was performed during a Transport Layer Security (TLS) handshake, then the Finished message can be used to derive the challenge, as the Finished message already contains the Message Authentication Code (MAC) of the TLS handshake messages.

When the MS 101 receives the CHAP challenge, the MS 101 validates that the challenge was in deed derived from the key agreement procedure to prevent the man-in-the-middle attack. The MS 101 then calculates a CHAP response and sends the response back to the BSF 107, which in turn validates the response with the MN-AAA 109. If the MN-AAA 109 indicates that the CHAP response is correct, then the BSF 107 has authenticated the MS 101, and the GAA master secret has been established. The GAA master secret can be the agreed key itself, or further derived from that key.

Alternatively, to establish the secret between the MS 101 and the BSF 107, another approach, according to an embodiment of the invention, utilizes a server authenticated transport layer security (TLS) where the BSF is authenticated using a server certificate. In this case, the CHAP challenge does not need to be tied to the master secret as above as the BSF 107 is already authenticated. In these cases (both the original point-to-point protocol (PPP) CHAP authentication and the described GAA related procedures), the MS 101 does not answer to the CHAP challenge if the server (i.e., PDSN 111 or BSF 107) has not been authenticated; otherwise, there is a possibility for a man-in-the-middle attack.

The invention, according to one embodiment, provides a mechanism to agree on a master secret between the MS 101 and the network server (BSF 107), which is bound to authentication of the MS 101 to a backend server (e.g., MN-AAA 109). This approach advantageously can be performed such that the backend server is unmodified, while utilizing standardized protocols.

Conventional approaches do not support bootstrapping from CHAP authentication in such a way that the resulting security association can be reused with multiple servers, as performed in GAA. One such technique is the Diffie-Hellman—Challenge Handshake Authentication Protocol (DH-CHAP), which describes a specific mechanism to bind CHAP authentication to Diffie-Hellman key agreement by adding new information elements to the CHAP protocol messages between the CHAP initiator and responder (i.e., requiring modification of CHAP).

It is assumed, in an exemplary embodiment, that the original PPP CHAP authentication procedure in CDMA 1× EvDo networks has a mechanism to prevent an unauthorized server from sending a CHAP challenge to the MS 101 and receiving a response. Without this mechanism, there is a possibility for a man-in-the-middle attack where the attacker initiates communications with the BSF 107 pretending to be the MS 101. At the point where the attacker receives the challenge from the BSF 107, the attacker can forward the challenge to the real MS 101, thereby pretending to be the PDSN 111. The MS 101 would calculate the response and send it back to the attacker, who in turn would send it to the BSF 107. If this is successful, the attacker has successfully created a bootstrapping session and can use the GAA credentials with any Network Application Function (NAF).

Figure 2:
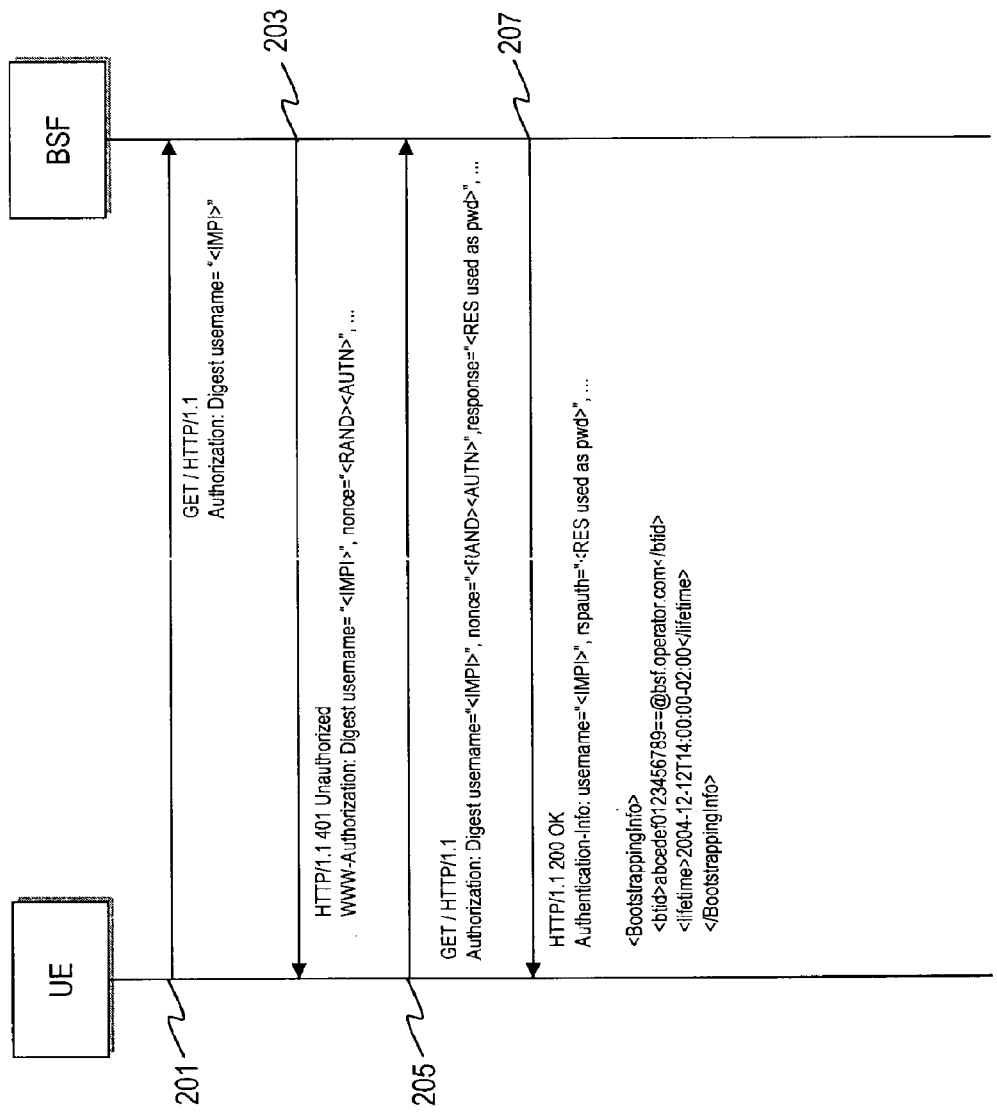
FIG. 2 is a diagram of an exemplary bootstrapping procedure utilized in the system of FIG. 1.

FIG. 2 is a diagram of an exemplary bootstrapping procedure utilized in the system of FIG. 1. Although one user equipment (UE) is shown for the purposes of explanation, it is contemplated that multiple UEs are typically employed. The UEs can also be denoted as mobile devices (e.g., mobile telephone), mobile stations, and mobile communications devices. The UE can also be such devices as personal digital assistants (PDA) with transceiver capability or personal computers with transceiver capability.

In step 201, an UE, such as MS 101, sends a HTTP Digest message, GET/HTTP/1.1 Authorization: Digest username="<IMPI>," to the BSF 107. In response, the BSF 107, as in step 203, sends a 401 Unauthorized message. Next, in step 205, the UE sends a message that includes a part that is calculated using shared information as a shared password (e.g., response="<RES used as pwd>") back to the BSF 107.

Thereafter, the BSF 107 submits, as in step 207, a 200 OK message, which specifies bootstrapping information.

After the bootstrapping procedure both, the MS 101 (e.g., UE) and the BSF 107 have agreed on the key material (Ks), a bootstrapping transaction identifier (B-TID), a key material lifetime. After the bootstrapping procedure, the key material (Ks) can be used to derive further application server specific key materials (Ks_NAFs) that can be used with different servers. Ks_NAF and B-TID may be used in a Ua interface to mutually authenticate and optionally secure traffic between the UE and an application server (i.e., Network Application Function (NAF)). By way of example, the Ks is a 256b GAA shared secret (in 3GPP GAA Ks=CK||IK). The NAF can be an application server that uses GAA for user authentication.

The bootstrapping procedure (i.e., Ub interface) is defined in 3GPP TS 33.220, entitled "Generic Authentication Architecture (GAA); Generic Bootstrapping Architecture," and TS 24.109, "Bootstrapping Interface (Ub) and Network Application Function Interface (Ua); Protocol Details"; the entireties of which are incorporated herein by reference.

Figure 3:
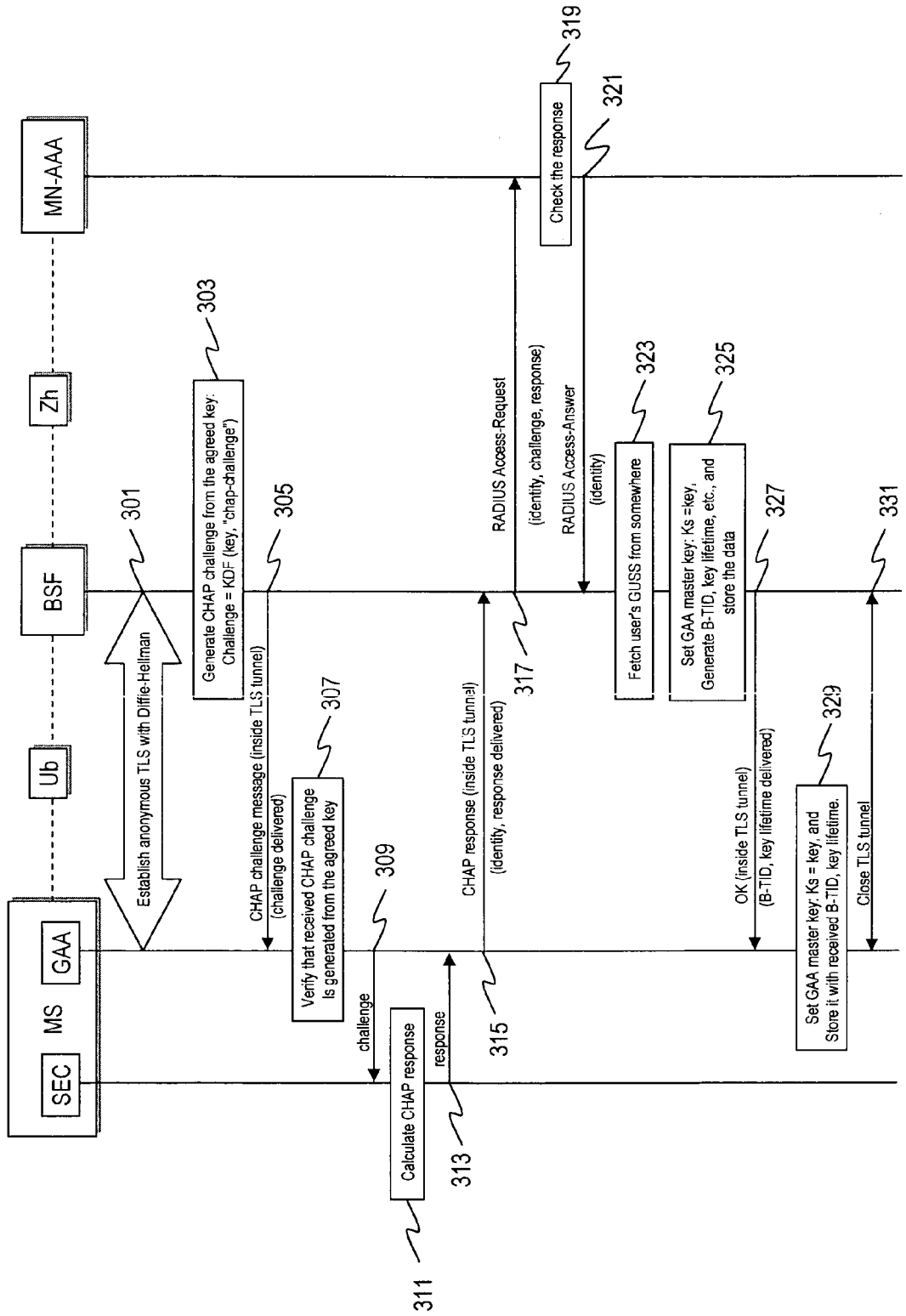
FIG. 3 is a diagram of a bootstrapping procedure utilizing anonymous Transport Layer Security (TLS) with Challenge Handshake Authentication Protocol (CHAP) challenge, according to an embodiment of the invention.

FIG. 3 is a diagram of a bootstrapping procedure utilizing anonymous TLS with CHAP challenge, according to an embodiment of the invention. Under this scenario, the reference points, Ub and Zh are involved, whereby Ub provides mutual authentication between the MS 101 and the BSF 107, and the Zh supports the exchange of authentication information between the BSF 107 and the MN-AAA 109. As discussed, traditionally the BSF 107 does not have knowledge of the CHAP secret, as only the MS 101 and the MN-AAA 109 possess such information. The PDSN 111 merely sends the CHAP-Challenge to the MN-AAA 109, and the MN-AAA 109 returns an identity and a CHAP-response which is computed using the CHAP-challenge and the CHAP secret. MN-AAA 109 can check the CHAP-response and determine either success or failure. Thus, agreement of the GAA secret between the MS 101 and the BSF 107 has to be arrived at by other means. In one embodiment of the invention, the GAA secret is established by means of an unauthenticated key agreement procedure, and the CHAP authentication is tied to the GAA secret by deriving the CHAP challenge from GAA secret, and the MS 101 checks that the GAA secret was used to derive the CHAP challenge.

In this example, the MS 101 includes a security (SEC) module to execute the CHAP protocol and a GAA module to support GAA functionalities. In step 301, the MS 101 employs anonymous TLS with a key exchange algorithm, such as Diffie-Hellman, to establish the GAA secret (denoted as "key") with the BSF 107. CHAP can then be run inside the TLS tunnel. Accordingly, in step 303, the BSF 107 generates a CHAP challenge from the agreed key: Challenge=KDF (key, "chap-challenge"). The key derivation function (KDF), in an exemplary embodiment, is provided according to the GAA.

The generic key derivation function, according to the GAA (TS 33.220), is now described. First, a string S is generated by concatenating the input parameters and associated lengths as follows. The length of each input parameter (in octets) is encoded into two-octet string. The number of octets is expressed in input parameter Pi as a number k in the range [0, 65535]. Li is a two-octet representation of the number k, with the most significant bit of the first octet of Li equal to the most significant bit of k, and the least significant bit of the second octet of Li equal to the least significant bit of k.

The string S is constructed from n input parameters as follows:

S=FC||P0||L0||P1||L1||P2||L2||P3||L3|| . . . ||Pn||Ln where

FC is single octet used to distinguish between different instances of the algorithm, P0 is a static ASCII-encoded string, L0 is the two octet representation of the length of the P0, P1 . . . Pn are the n input parameters, and L1 . . . Ln are the two-octet representations of the corresponding input parameters.

The derived key is equal to HMAC-SHA-256 computed on the string S using the key Key: derived key=HMAC-SHA-256 (Key, S).

The CHAP challenge message is then transmitted by the BSF 107 inside the TLS tunnel, as in step 305, to the GAA module of the MS 101. In step 307, the GAA module verifies the received CHAP challenge is generated from the agreed key. The CHAP challenge message is then forwarded to the SEC module, per step 309. Next, the SEC module calculates the CHAP response, as in step 311, and transmits the response to the GAA module (step 313). The MS 101 then sends, as in step 315, the CHAP response over the TLS tunnel to the BSF 107.

Thereafter, in step 317, the BSF 107 sends a Request message according to an authentication protocol (e.g., Remote Authentication Dial In User Service (RADIUS) Access-Request message) to the MN-AAA 109. RADIUS is detailed in Internet Engineering Task Force (IETF) Request For Comment (RFC) 2865 entitled "Remote Authentication Dial In User Service RADIUS)" (June 2000), which is incorporated herein by reference in its entirety. The Request message specifies a user (or subscriber) identity, challenge and response. The MN-AAA 109 checks the response, per step 319, and sends a RADIUS Access-Answer message (including the identity) to the BSF 107 (step 321). At this point, the BSF 107 fetches the user's GBA user security settings (GUSS), as in step 323. GUSS is a GAA specific user profile data that is related to NAF specific user identities and authorizations stored in the home location register (HLR). GUSS includes BSF 107 specific information element and application-specific user security settings (USSs). In an exemplary embodiment, a USS defines an application and subscriber specific parameter; such parameter includes an authentication part and an authorization part. The authentication part specifies user identities associated with the application, while the authorization part defines user permissions.

Further, the BSF 107 sets the GAA master key (Ks=key), generates various bootstrapping parameters (e.g., bootstrapping transaction identifier (B-TID), key material lifetime, etc.), and stores the data from the MN-AAA 109, per step 325. Next, the BSF 107, as in step 327, sends an OK message over the TLS tunnel; the transmitted message includes, e.g., the B-TID and the key material lifetime. In step 329, the GAA module sets the GAA master key: Ks=key, and stores the key with the received B-TID and key material lifetime. The MS 101 then sends a message to the BSF 107 to close the TLS tunnel, per step 331.

With the above process, the system of FIG. 1 provides GAA bootstrapping, such that the MS 101 and the BSF 107 are able to agree on a key, and that key is tied to the CHAP authentication procedure. Compared to Diffie-Hellman (DH)-CHAP, the approach adopted by the system of FIG. 1 does not require any changes to protocol messages that are already standardized, and can be implemented by appropriate "hook" functions in MS 101 and BSF 107. Also, DH-CHAP describes one specific way of binding CHAP authentication to D-H key: derive the challenge from the agreed key. The invention, according to various embodiments, provides other methods of indirectly binding the outer key to the inner authentication.

Figure 4:
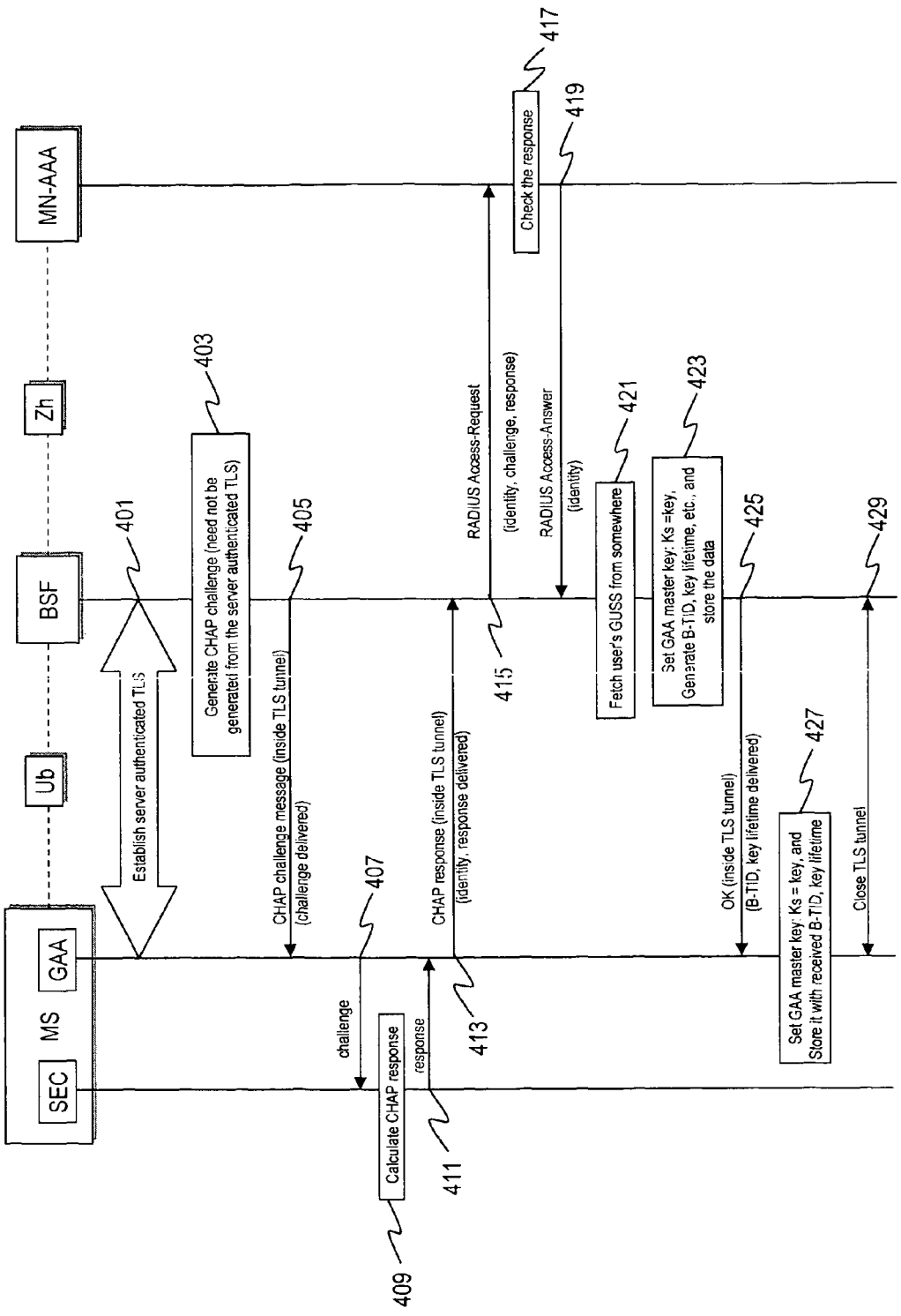
FIG. 4 is a diagram of a bootstrapping procedure utilizing server authenticated TLS with CHAP challenge, according to an embodiment of the invention.

FIG. 4 is a diagram of a bootstrapping procedure supporting server authenticated TLS with CHAP challenge, according to an embodiment of the invention. In this alternative embodiment, a server authenticated TLS is used to establish the GAA secret between the MS 101 and the BSF 107, wherein CHAP is employed inside the TLS tunnel. Specifically, in step 401, the MS 101 establishes a server authenticated TLS tunnel with the BSF 107. As before, the TLS key is denoted by 'key'. Next, in step 403, the BSF 107 generates a CHAP challenge—which need not be generated from the server authenticated TLS key. The CHAP challenge message is then transmitted by the BSF 107 inside the TLS tunnel, as in step 405, to the GAA module of the MS 101.

The GAA module then forwards the CHAP challenge to the SEC module, per step 407. Subsequently, the SEC module calculates the CHAP response, as in step 409, and transmits the response to the GAA module (step 411). The MS 101 then sends the CHAP response over the TLS tunnel to the BSF 107, per step 413.

In step 415, the BSF 107 sends a RADIUS Access-Request message to the MN-AAA 109; the Request message specifies the identity, challenge and response. The MN-AAA 109 checks the response, per step 417, and sends a RADIUS Access-Answer message (including the identity) to the BSF 107 (step 419). At this point, the BSF 107 fetches the user's GUSS, as in step 421. Additionally, the BSF 107 sets the GAA master key (Ks=key), generates various bootstrapping parameters (e.g., bootstrapping transaction identifier (B-TID), key material lifetime, etc.), and stores the data from the MN-AAA 109, per step 423.

Next, the BSF 107, as in step 425, sends an OK message over the TLS tunnel. The transmitted message includes the bootstrapping parameters, e.g., the B-TID and the key material lifetime. In step 427, the GAA module sets the GAA master key: Ks=key, and stores the key with the received B-TID and key material lifetime. The MS 101 then sends a message to the BSF 107 to close TLS tunnel, per step 429.

Figure 5:
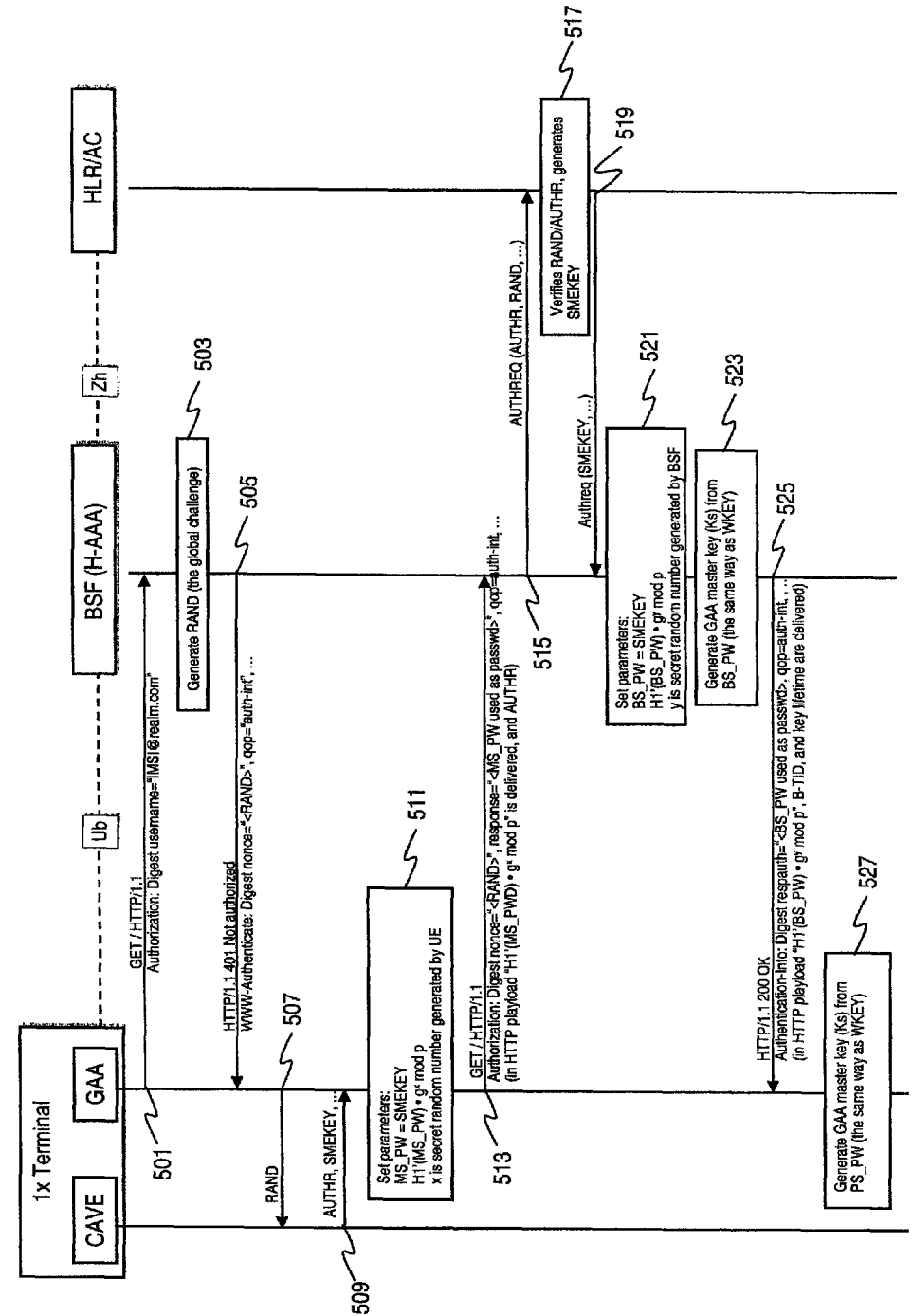
FIGS. 5 and 6 are diagrams of bootstrapping procedures supporting key exchange parameters in the payload, according to various embodiments of the invention.
Figure 6:
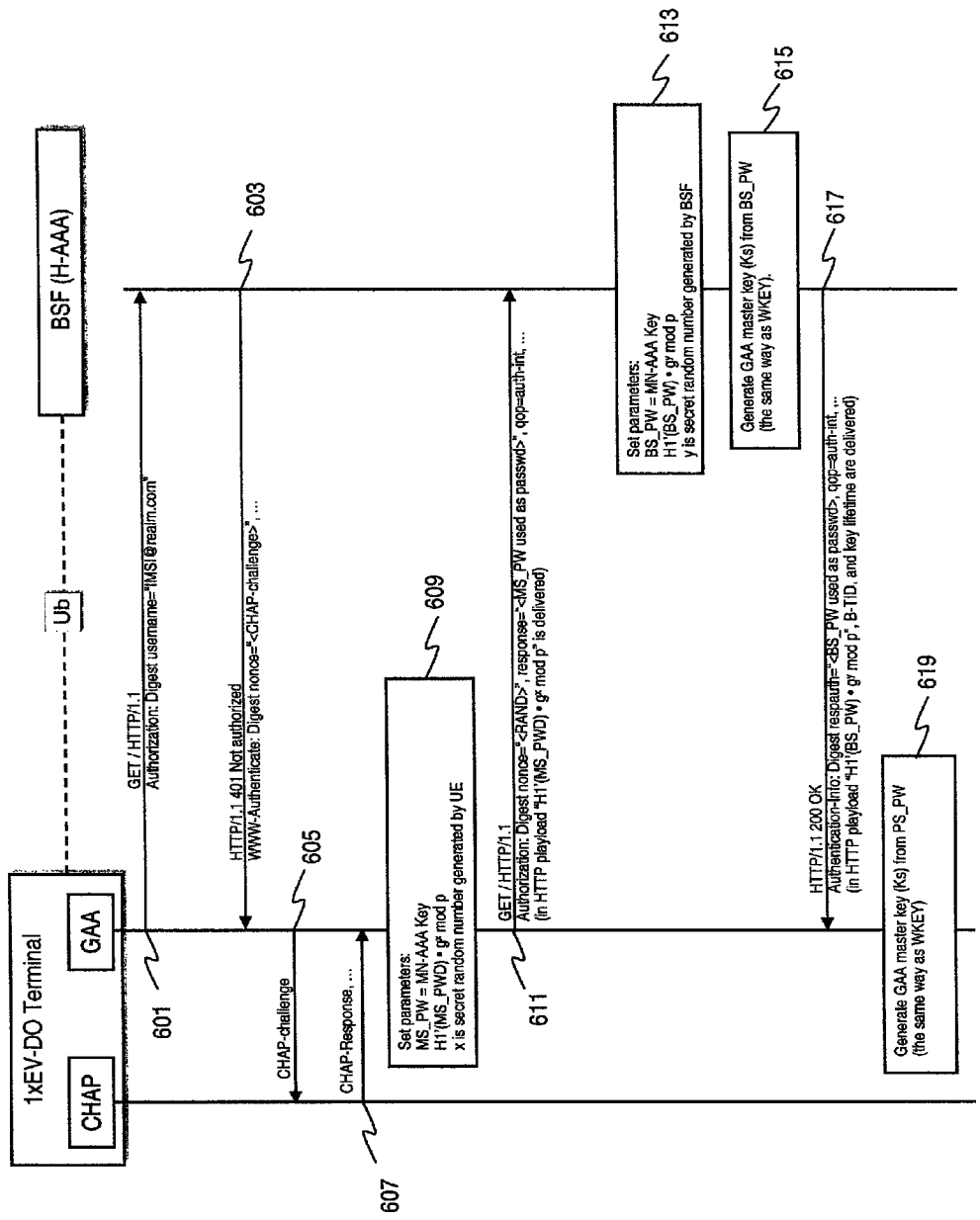

FIGS. 5 and 6 are diagrams of bootstrapping procedures supporting key exchange parameters (or key establishment information) in the payload, according to various embodiments of the invention. It is recognized that no conventional approaches exist for providing password protected Diffie-Hellman (i.e., key exchange protocol) within the HyperText Transfer Protocol (HTTP). The processes of FIGS. 5 and 6 enable use of HTTP Digest and Diffie-Hellman parameters together to provide password protected Diffie-Hellman for use in bootstrapping (e.g., as in the 3GPP2 architecture). That is, approaches are provided for usage of HTTP Digest with password (i.e., shared secret), and the key exchange protocol (e.g., Diffie-Hellman) parameters in HTTP payload and for binding the two together. The password field is set to be a function of the secret key.

In accordance with one embodiment of the invention, a HTTP Digest message uses Signaling Message Encryption Key (SMEKEY) or MN-AAA key as a password and mobile identity as the username; the Diffie-Hellman parameters are provided in the HTTP payload. Diffie-Hellman exchange is protected by the password because the quality-of-protection "qop" field in HTTP Digest is set to "auth-int"; consequently, the HTTP payload is included in the digest calculation. In the HTTP payload, the Diffie-Hellman parameters can be transferred as is; alternatively, the HTTP payload can be provided with password protection. This approach advantageously permits existing specifications (e.g., HTTP Digest) to be reused. Also, the approach resembles 3GPP GAA functionality (e.g., HTTP Digest Authentication and Key Agreement Protocol (AKA), Ub interface). Further, the approach, according to various embodiments, can be easily implemented without modifying existing, standardized protocols.

The 3GPP GAA may be used without modification to current CDMA 2000 networks. It is recognized, however, that the initial authentication of 3GPP GAA requires adaptation for networks that are based on earlier 3GPP2 releases or in networks that do not support AKA and hence are only adapted for CAVE. Accordingly, a system architecture and process are needed to accommodate CAVE. The system 100, according to various embodiments, employs conversion functions to map 3GPP2 CAVE authentication to HTTP Digest AKA; this approach is particularly applicable to pre-CDMA 2000 Rev. C systems.

HTTP Digest Authentication enables a client to authenticate itself with the server without having to transmit the password in the clear. This can be accomplished by utilizing a "one-way" function or irreversible computation using the password and a random value supplied by the server as input values. HTTP Digest Authentication in the context of AKA is detailed in IETF (Internet Engineering Task Force) Request for Comment 3310, entitled "Hypertext Transfer Protocol (HTTP) Digest Authentication Using Authentication and Key Agreement (AKA)," which is incorporated herein by reference in its entirety.

For the purposes of illustration, the bootstrapping procedures of FIGS. 5 and 6 are described with respect to CDMA 1× networks and CDMA 1× EvDo networks, respectively. In an exemplary embodiment, these bootstrapping procedures are based on X.P0028; in which a key difference with X.P0028 is that HTTP Digest variant is used instead of Extensible Authentication Protocol (EAP) between terminal and BSF 107 (which can be considered a Home (H)-AAA). Additionally, password protected Diffie-Hellman can be used. The password (i.e., shared secret) is either Signaling Message Encryption Key (SMEKEY) (CDMA 1×) or MN-AAA Key (CDMA 1× EvDo). A wireless LAN (WLAN) key (WKEY) is generated from the password (which is detailed in X.P0028). Additionally, WKEY is the GAA's master key (Ks). HTTP Digest is used (as shown in FIGS. 5 and 6). The invention, according various embodiments, describes how CAVE and CHAP can be used in a 3GPP GAA architecture for initial authentication.

As shown in FIG. 5, a terminal (e.g., mobile station) includes a CAVE module configured to execute the CAVE protocol. Additionally, GAA functionalities are supported by a GAA module. In step 501, the GAA module generates a HTTP Get message, which is sent to the BSF 107; the identity is sent in the first message in the "username" field. This authorization request message, in an exemplary embodiment, includes the fields specified in Table 1, below:

TABLE 1

| | |
|---|---|
| credentials = | "Digest" digest-response |
| digest-response = | 1#(username \| realm \| nonce \| digest-uri \| response \| [algorithm] \| [cnonce] \| [opaque] \| [message-qop] \| [nonce-count] \| [auth-param]) |
| username = | "username" "=" username-value |
| username-value = | quoted-string |
| digest-uri = | "uri" "=" digest-uri-value |
| digest-uri-value = | request-uri ; As specified by HTTP/1.1 |
| message-qop = | "qop" "=" qop-value |
| cnonce = | "cnonce" "=" cnonce-value |

TABLE 1-continued

| | |
|---|---|
| cnonce-value = | nonce-value |
| nonce-count = | "nc" "=" nc-value |
| nc-value = | 8LHEX |
| response = | "response" "=" request-digest |
| request-digest = | <"> 32LHEX <"> |
| LHEX = | "0" \| "1" \| "2" \| "3" \| "4" \| "5" \| "6" \| "7" \| "8" \| "9" \| "a" \| "b" \| "c" \| "d" \| "e" \| "f" |

Some of the directives in Table 1 are defined in Table 2:

TABLE 2

| Directive | Description |
|---|---|
| response | A string of 32 hex digits to provide proof that the user knows the password |
| username | The user's name in the specified realm |
| digest-uri | The URI from Request-URI of the Request-Line |
| qop | Indicates type of "quality of protection" applied to the message |
| cnonce | This is specified if a qop directive is sent. The cnonce-value is an opaque quoted string value provided by the client and used by both client and server to avoid chosen plaintext attacks, to provide mutual authentication, and to provide some message integrity protection. |
| nonce-count | This is specified if a qop directive is sent. The nc-value is the hexadecimal count of the number of requests (including the current request) that the client has sent with the nonce value in this request. For example, in the first request sent in response to a given nonce value, the client sends "nc=00000001". The purpose of this directive is to allow the server to detect request replays by maintaining its own copy of this count - if the same nc-value is seen twice, then the request is a replay. |
| auth-param | This directive allows for future extensions. Any unrecognized directive is ignored. |

The BSF 107 then generates the RAND, as in step 503, and responds with a 401 Not Authorized message (step 505). Initially, no authorization header is sent to the BSF 107, and thus, the 401 message is utilized as a response. As shown, the RAND is sent in the "nonce" field (similar to HTTP Digest AKA). RAND and CHAP-Challenge can also be sent in the HTTP payload. Upon receiving the RAND, the GAA module forwards it to the CAVE module, as in step 507.

By way of example, an Authenticate Response Header is provided in Table 3; the associated directives are defined in Table 4.

TABLE 3

| | |
|---|---|
| challenge = | "Digest" digest-challenge |
| digest-challenge = | 1#(realm \| [domain] \| nonce \| [opaque] \| [stale] \| [algorithm] \| [qop-options] \| [auth-param]) |
| domain = | "domain" "=" <"> URI (1*SP URI) <"> |
| URI = | absoluteURI \| abs_path |
| nonce = | "nonce" "=" nonce-value |
| nonce-value = | quoted-string |
| opaque = | "opaque" "=" quoted-string |
| stale = | "stale" "=" ("true" \| "false") |
| algorithm = | "algorithm" "=" ("MD5" \| "MD5-sess" \| token) |
| qop-options = | "qop" "=" <"> 1#qop-value <"> |
| qop-value = | "auth" \| "auth-int" \| token |

TABLE 4

| Directive | Description |
|---|---|
| realm | A string to be displayed to users so they know which username and password to use. This string can include the name of the host performing the authentication and the users who might have access. |
| domain | A quoted, space-separated list of URIs that define the protection space. The client can use this list to determine the set of URIs for which the same authentication information may be sent: any URI that has a URI in this list as a prefix (after both have been made absolute) may be assumed to be in the same protection space. If this directive is omitted or its value is empty, the client is to assume that the protection space includes all URIs on the responding server. |
| nonce | A server-specified data string that can be uniquely generated each time a 401 response is made. |
| opaque | A string of data, specified by the server, which can be returned by the client unchanged in the Authorization header of subsequent requests with URIs in the same protection space. |
| stale | A flag, indicating that the previous request from the client was rejected because the nonce value was stale. If stale is TRUE (case-insensitive), the client can retry the request with a new encrypted response, without reprompting the user for a new username and password. The server should only set stale to TRUE if it receives a request for which the nonce is invalid but with a valid digest for that nonce (indicating that the client knows the correct username/password). If stale is FALSE, or anything other than TRUE, or the stale directive is not present, the username and/or password are invalid, and new values are obtained. |
| algorithm | A string indicating a pair of algorithms used to produce the digest and a checksum. |

In step 509, the CAVE module sends the Authentication Response (denoted "AUTHR") and SMEKEY to the GAA module. The GAA module then, as in step 511, sets the mobile station password (MS_PW): MS_PW=SMEKEY H1'(MS_PW)·$g^x$ mod p, where x is the secret random number generated by the UE.

Next, the GAA module sends, per step 513, an HTTP message with a payload that includes the client Diffie-Hellman parameters to the BSF 107. With CAVE, the HTTP payload also contains the AUTHR. The payload is protected by HTTP Digest because qop=auth-int; also HTTP payload is included in HTTP Digest calculation of "response" field. The Diffie-Hellman parameters can be sent as is or can be protected. In step 515, the BSF 107 transmits an Authentication Request ("AUTHREQ") message (including AUTHR and RAND) to the home location register/authentication center (HLR/AC), which verifies the RAND/AUTHR and generates the SMEKEY (step 517). The SMEKEY is sent to the BSF 107, per step 519.

The BSF 107, as in step 521, sets the base station password: BS_PW=SMEKEY H1'(BS_PW)·$g^y$ mod p, where y is the secret random number generated by the BSF. Subsequently, the BSF 107 generates the GAA master key (Ks) from the BS_PW (in a similar manner to that of WKEY).

Next, the BSF 107 then sends an HTTP 200 OK message to the terminal, per step 525. The server Diffie-Hellman parameters are sent in the HTTP payload, protected by HTTP Digest because qop=auth-int (i.e., also HTTP payload is included in HTTP Digest calculation of "respauth" field). According to one embodiment, an authentication information header is provided in the message of step 525 to indicate the successful authentication, per Table 5 below:

TABLE 5

| | |
|---|---|
| AuthenticationInfo = | "Authentication-Info" ":" auth-info |
| auth-info = | 1#(nextnonce | [message-qop] |
| | | [response-auth] | [cnonce] |
| | | [nonce-count]) |
| nextnonce = | "nextnonce" "=" nonce-value |
| response-auth = | "rspauth" "=" response-digest |
| response-digest = | <"> *LHEX <"> |

The message-qop directive indicates the "quality of protection" options applied, whereby the value "auth" indicates authentication, and the value "auth-int" indicates authentication with integrity protection.

In step 527, the GAA module generates the GAA master key, Ks, from the PS_PW (in a similar manner as the procedures for the WKEY).

In the case of bootstrapping in the CDMA 1× EvDo, CHAP is utilized (as shown in FIG. 6). Under this scenario, the GAA module issues a HTTP Get message, which is sent to the BSF 107; the identity is sent in the first message in the "username" field. The BSF 107 responds, as in step 603, with a 401 message; in this CHAP case, the CHAP-Challenge is sent in the "nonce" (i.e., field is just random, as in standard HTTP Digest). Next, a CHAP challenge and response is exchanged between the GAA module and the CHAP module (steps 605 and 607). In step 609, the GAA module sets the following parameters: BS_PW=MN-AAA key; H1'(BS_PW)·$g^x$ mod p, where x is the secret random number generated by the UE.

At this point, the terminal, using the GAA module, generates and transmits an Authorization message to the BSF 107 (step 611); the message specifies the following: Digest nonce="<RAND>", response="<MS_PW used as passwd>", qop=auth-int, . . . . The HTTP payload includes H1'(MS_PWD)·$g^x$ mod p. In step 613, the BSF 107 sets the base station password (BS_PW): BS_PW=MN-AAA key; H1'(BS_PW)·$g^y$ mod p, where y is the secret random number generated by the BSF. Also, the BSF 107 generates the GAA master key, Ks, from the BS_PW.

Thereafter, the BSF 107 transmits a 200 OK message that specifies H1'(MS_PWD)·$g^y$ mod p, B-TID and key lifetime to the GAA module (step 617). In step 619, the GAA module generates the GAA master key, Ks, from the MS_PWD. The WKEY is set to GAA master secret (Ks).

Figure 7:
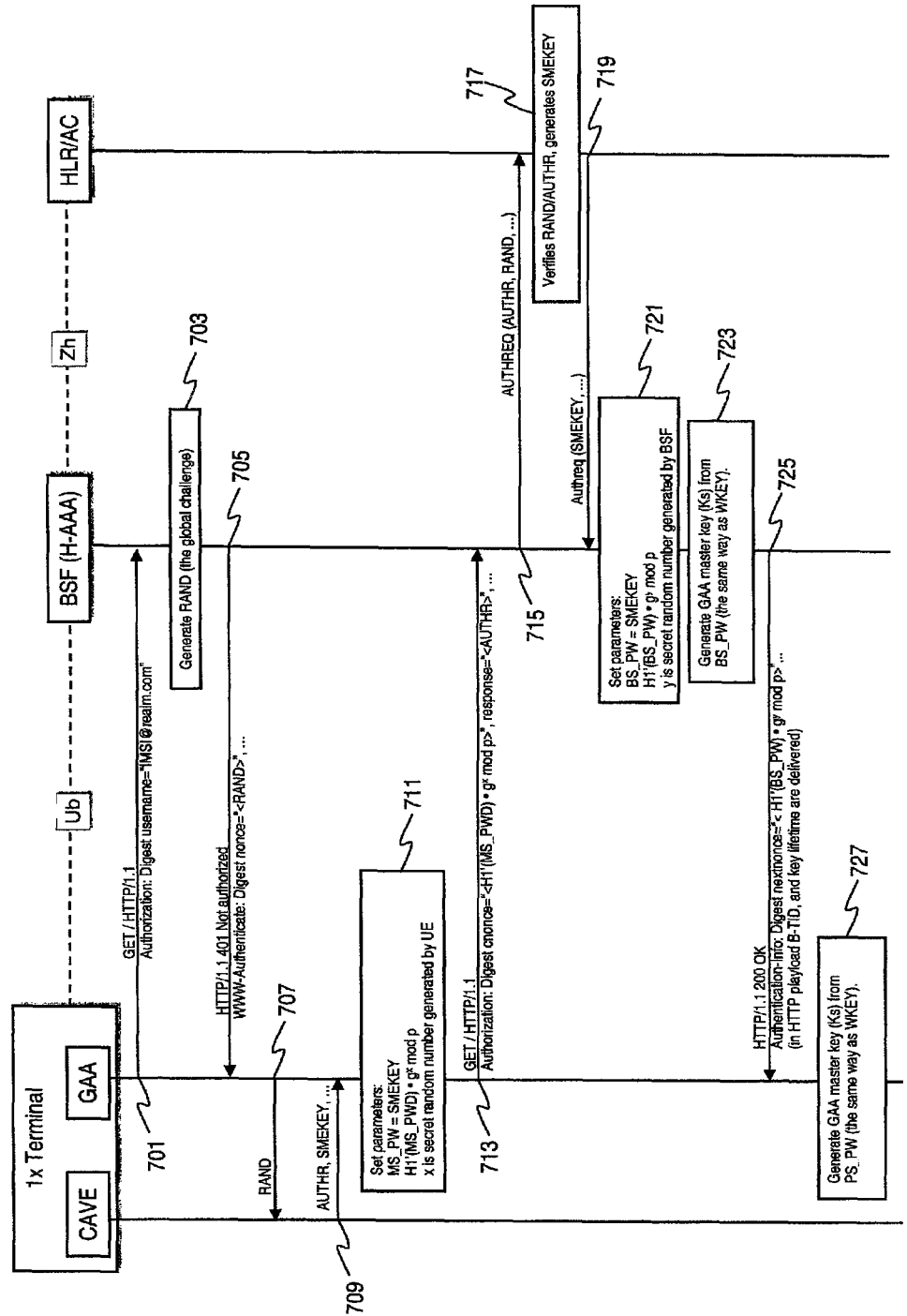
FIGS. 7 and 8 are diagrams of bootstrapping procedures supporting key exchange parameters that are covered by the hash of the passwords, according to various embodiments of the invention.
Figure 8:
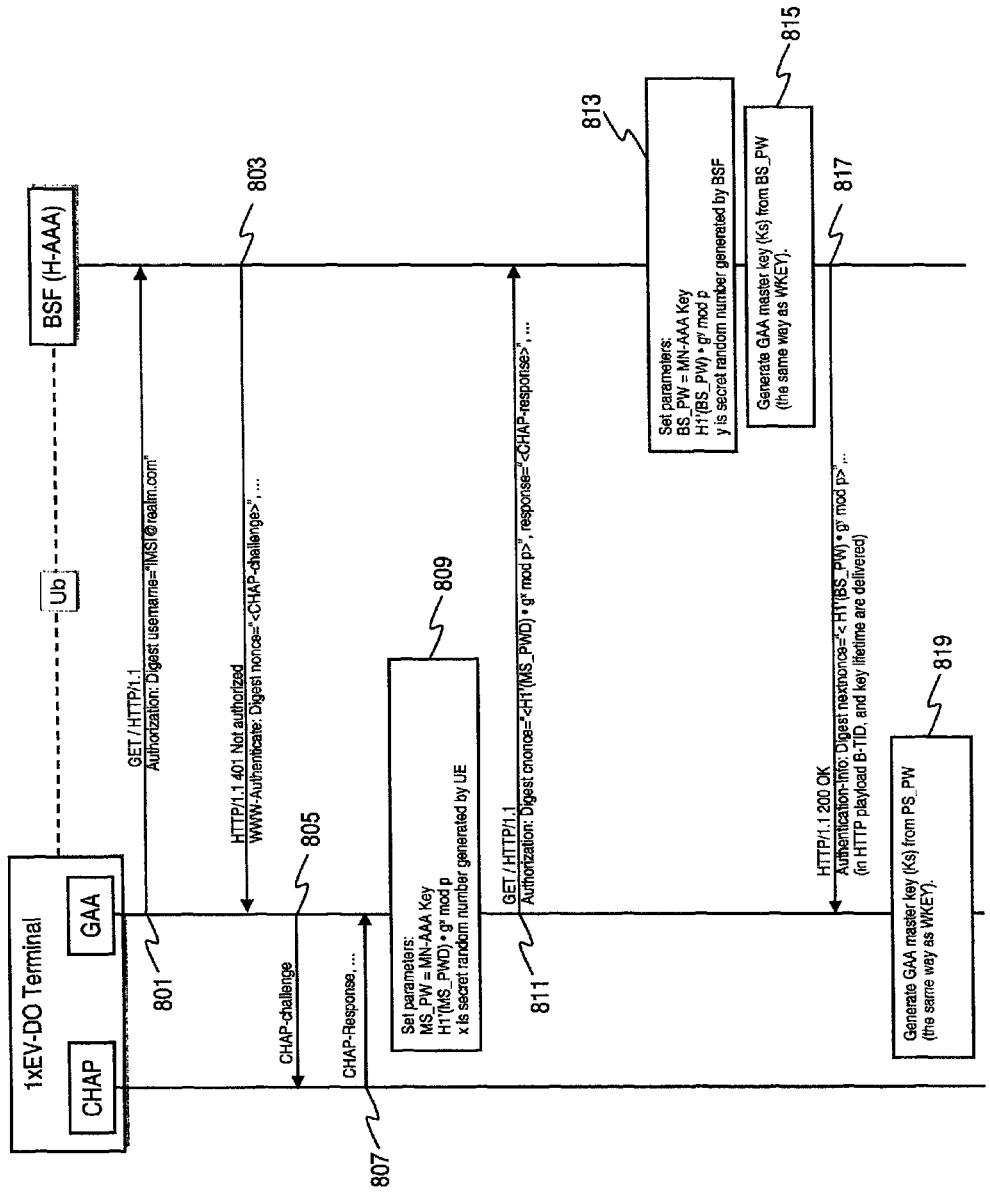

FIGS. 7 and 8 are diagrams of bootstrapping procedures supporting key exchange parameters that are covered by the hash of the passwords, according to various embodiments of the invention. The bootstrapping procedure of FIG. 7 resembles that of FIG. 5; that is, steps 701-711 correspond largely to steps 501-511. Similarly, the procedure of FIG. 8 follows that of FIG. 6, whereby steps 801-809 track with steps 601-609. However, under the scenarios of FIGS. 7 and 8, the client Diffie-Hellman parameters are covered by the hash of password (i.e., SMEKEY, or MN-AAA Key), which is sent in the "cnonce" field. The hash can be generated based on standard HTTP Digest calculations.

With respect to the procedure of FIG. 7, in step 713 the message that is transmitted from the GAA module to the BSF 107 includes cnonce="<H1' (MS_PWD)·$g^x$ mod p>". Steps 715-723 follow steps 515-523 of FIG. 5. Under the present scenario, in step 725, the BSF 107 transmits a 200 OK message that specifies nextnonce="<H1' (MS_PWD)·$g^y$ mod p>". That is, the server Diffie-Hellman parameters are covered by the hash of password (i.e., SMEKEY, or MN-AAA-KEY) that is sent in the "nextnonce" field. Thereafter, the GAA module generates the GAA master key, Ks, from the PS_PW (step 727).

As for the bootstrapping procedure of FIG. 8, the HTTP message of step 811 includes <H1'(MS_PWD)·$g^x$ mod p> in the cnonce field. Steps 813-819 generally track with steps 613-619, with the exception that 200 OK message of step 817 specifies nextnonce="<H1'(BS_PWD)·$g^y$ mod p>".

Figure 9:
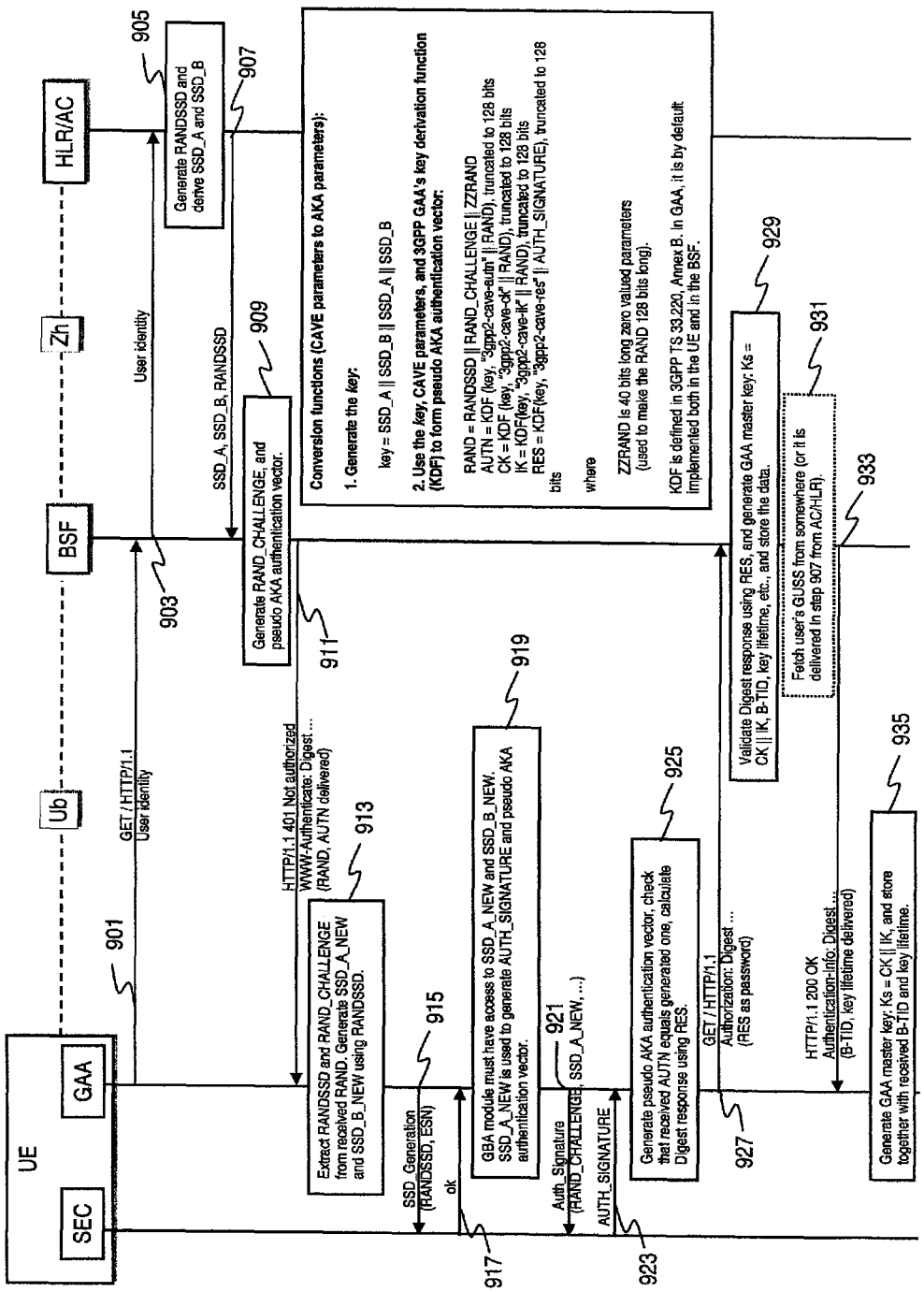
FIG. 9 is a diagram of a bootstrapping procedure utilizing Cellular Authentication and Voice Encryption (CAVE) with one shared secret data (SSD), according to an embodiment of the invention.

FIG. 9 is a diagram of a bootstrapping procedure utilizing CAVE with one shared secret data (SSD), according to an embodiment of the invention. The UE (via the GAA module) provides a SSD generation function and an authentication function, whereby the GAA application requires access to SSD_A_NEW and SSD_B_NEW. In step 901, the bootstrapping procedure is initiated between the UE and the BSF 107 with submission by the UE of a GET request to the BSF 107. This GET request includes a user identity, which the BSF 107 forwards to the HLR/AC (step 903). The HLR/AC then generates a random SSD ("RANDSSD") and derives SSD_A and SSD_B using the CAVE algorithm (step 905); this information is forwarded to the BSF 107, per step 907. The SSD, in an exemplary embodiment, is a 128-bit shared secret data and includes a 64-bit SSD_A key used for authentication and a 64-bit SSD-B key used along with other parameters to generate the encryption mask and private long code. RANDSSD is a 56 bit random challenge generated in HLR/AC. The SSD is a concatenation of the SSD_A key and the SSD_B key.

In step 909, the BSF 107 generates a RAND_CHALLENGE and a pseudo AKA authentication vector. By way of example, the RAND_CHALLENGE is a 32 bit random challenge. To generate the AKA authentication vector, conversion functions are performed, in accordance with an embodiment of the invention, to convert (or map) the CAVE parameters generated in step 905 to AKA parameters. The conversion functions are used to generate a pseudo AKA authentication vector from either one or two sets of CAVE parameters, including RANDSSD, SSD_A, SSD_B, and AUTH_SIGNATURE.

As shown in FIG. 9, the conversion functions provide for the generation of a key, where SSD_A and SSD_B are concatenated as follows: key=SSD_A∥SSD_B∥SSD_A∥SSD_B. Next, the key, CAVE parameters, and the 3GPP GAA key derivation function (KDF) are used to form a pseudo AKA authentication vector (which includes the RAND, an authentication token (AUTN), a cipher key (CK), an integrity key (IK), and an authentication response (RES)). By way of example, the pseudo AKA authentication vector can be generated as follows:

RAND=RANDSSD∥RAND_CHALLENGE∥ZZRAND

AUTN=KDF (key, "3gpp2-cave-autn"∥RAND), truncated to 128 bits

CK=KDF (key, "3gpp2-cave-ck"∥RAND), truncated to 128 bits

IK=KDF(key, "3gpp2-cave-ik"∥RAND), truncated to 128 bits

RES=KDF(key, "3gpp2-cave-res"∥AUTH_SIGNATURE), truncated to 128, where ZZRAND is 40 bits long zero valued parameters (for extending the RAND to 128 bits).

In step 911, the BSF 107 sends an HTTP 401 message to the UE (e.g., MS 101); the message specifies the RAND and AUTN. Upon receipt of this message, the MS 101 extracts, as in step 913, the RANDSSD and RAND_CHALLENGE from the received RAND. The MS 101 then generates the SSD_A_NEW key and the SSD_B_NEW key using RANDSSD.

The GAA module, as in step 915, sends the RANDSSD and the ESN to the SEC module, which acknowledges with an OK message (per step 917). The ESN is, for instance, a 32 bits Electronic Cellular Authentication Number of the terminal (or mobile station (MS)).

In step 919, the SSD_A_NEW is used to generate an AUTH_SIGNATURE and pseudo AKA authentication vector. The GAA module sends an AUTH_SIGNATURE message to the SEC module, as in step 921. The SEC module responds, per step 923, with an appropriate response (AUTH_SIGNATURE). Next, in step 925, the GAA module generates the pseudo AKA authentication vector, determines whether the received AUTN equals the generated one, and calculates the Digest response using RES.

In step 927, the UE sends a HTTP message, including RES as the password, to the BSF 107. In turn, the BSF 107 validates, as in step 929, the Digest response using the RES, and generates the GAA master key (Ks=CK||IK), B-TID, key lifetime, etc.; such data is stored. Next, the BSF 107 fetches, as in step 931, the GUSS; alternatively, this information can be delivered in step 907.

The BSF 107 then sends a 200 OK message, which specifies the B-TID and key lifetime, to the MS 101, per step 933. At this point, the MS 101 generates the GAA master key, Ks, which is stored along with the received B-TID and key lifetime (step 935).

Figure 10A:
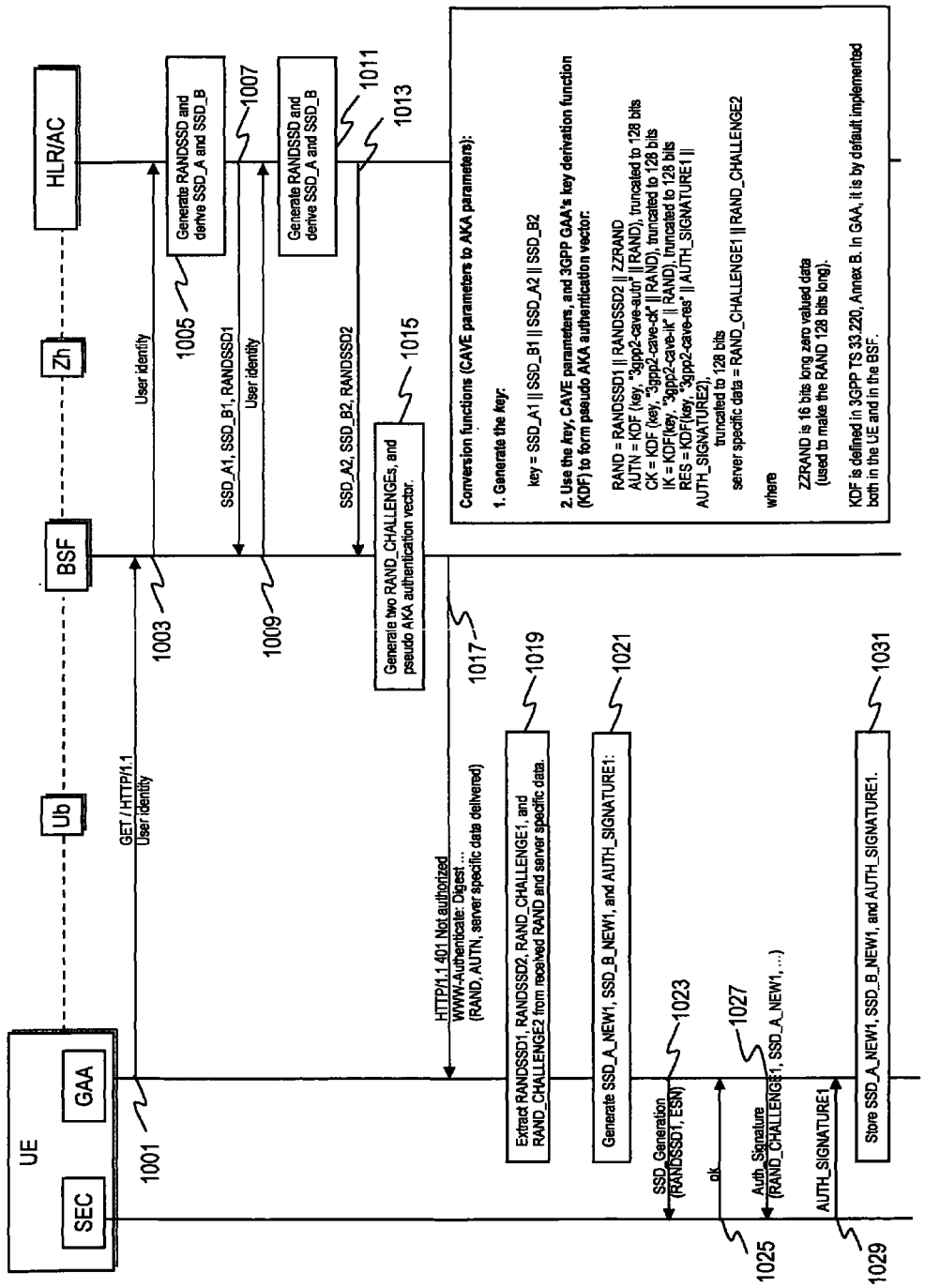

FIGS. 10A and 10B are diagrams of a bootstrapping procedure utilizing CAVE with multiple SSDs, according to an embodiment of the invention. As with the procedure of FIG. 9, the GAA module shown here includes SSD generation and authentication functions; also, the GAA application requires access to SSD_A_NEW and SSD_B_NEW. In this example, as shown in FIGS. 10A and 10B, for a message sequence, two SSDs and two RANDSSDs may be used to obtain, for example, a 256 bit Generic Bootstrapping Architecture (GBA) share secret (Ks). In step 1001, the UE sends a GET request to the BSF 107 to initiate the bootstrapping procedure. The user identity from the GET request is forwarded to the HLR/AC, per step 1003. Next, the HLR/AC generates a RANDSSD and derives a first set of SSD_A and SSD_B (denoted as "SSD_A1 and SSD_B1"), per step 1005. The RANDSSD (e.g., "RANDSSD1") along with SSD_A1 and SSD_B1 are transmitted to the BSF 107, per step 1007.

In steps 1009 and 1011, the user identity is again forwarded to the HLR/AC, and the HLR/AC generates another set of CAVE parameters: RANDSSD2, SSD_A2, and SSD_B2. These parameters are subsequently forwarded to the BSF 107, as in step 1013.

In step 1015, the BSF 107 generates a RAND_CHALLENGE and a pseudo AKA authentication vector. As with the procedure of FIG. 9, conversion functions are used to generate a pseudo AKA authentication vector from the CAVE parameters (e.g., RANDSSD1, SSD_A1, SSD_B1, AUTH_SIGNATURE1, RANDSSD2, SSD_A2, SSD_B2, and AUTH_SIGNATURE2).

A key is generated as follows: key=SSD_A1||SSD_B1||SSD_A2||SSD_B2. Next, the key, CAVE parameters, and the GAA key derivation function (KDF) are used to form the pseudo AKA authentication vector. The vector includes the RAND, AUTN, CK, IK, and RES, and, by way of example, is determined as follows:

RAND=RANDSSD1||RANDSSD2||ZZRAND
AUTN=KDF (key, "3gpp2-cave-autn"||RAND), truncated to 128 bits
CK=KDF (key, "3gpp2-cave-ck"||RAND), truncated to 128 bits
IK=KDF(key, "3gpp2-cave-ik"||RAND), truncated to 128 bits
RES=KDF(key, "3gpp2-cave-res"||AUTH_SIGNATURE1||AUTH_SIGNATURE2), truncated to 128 bits
Server specific data=RAND_CHALLENGE1||RAND_CHALLENGE2,
where ZZRAND is 16 bits long zero valued data (used to pad the RAND to 128 bits).

In step 1017, the BSF 107 sends an HTTP 401 message that specifies the RAND, AUTN and the server specific data to the GAA module. Upon receipt of this message, the GAA module extracts the RANDSSD1, RANDSSD2, RAND_CHALLENGE1 and RAND_CHALLENGE2 from the received RAND and the server specific data (step 1019). The GAA module then generates the SSD_A_NEW1 and SSD_B_NEW1 as well as AUTH_SIGNATURE1, per step 1021.

Next, the GAA module forwards an SSD generation message (SSD_generation), which includes the RANDSSD1 and the ESN, to the SEC module. In response, the SEC module acknowledges with an OK message (steps 1023 and 1025).

Additionally, the GAA module forwards an AUTH_SIGNATURE message to the SEC module (step 1027); the AUTH_SIGNATURE message specifies RAND_CHALLENGE1 and SSD_B_NEW1.

In step 1029, the SEC module provides the GAA module with AUTH_SIGNATURE1. At this point, the GAA module stores, as in step 1031, the SSD_A_NEW1, SSD_B_NEW1, and AUTH_SIGNATURE1.

Steps 1033-1043 essentially correspond to steps 1021-1031, but for the second set of parameters: SSD_A_NEW2, SSD_B_NEW2, and AUTH_SIGNATURE2.

In step 1045, the GAA module generates the pseudo AKA authentication vector, and determines whether the received AUTN equals the generated one. The GAA module also outputs a Digest response based on the RES.

Next, the UE sends, as in step 1047, a HTTP message including RES as the password to the BSF 107. The BSF 107 validates, as in step 1049, the Digest response using the RES, and generates the GAA master key (Ks=CK||IK), B-TID, key lifetime, etc.; the BSF 107 also stores the data. In step 1051, the BSF 107 fetches the GUSS (which can alternatively be delivered in step 1007).

The BSF 107 then sends, as in step 1053, a 200 OK message, which specifies the B-TID and key lifetime, to the UE. Thereafter, the UE generates the GAA master key, Ks, which is stored along with the received B-TID and key lifetime (step 1055).

Figure 11:
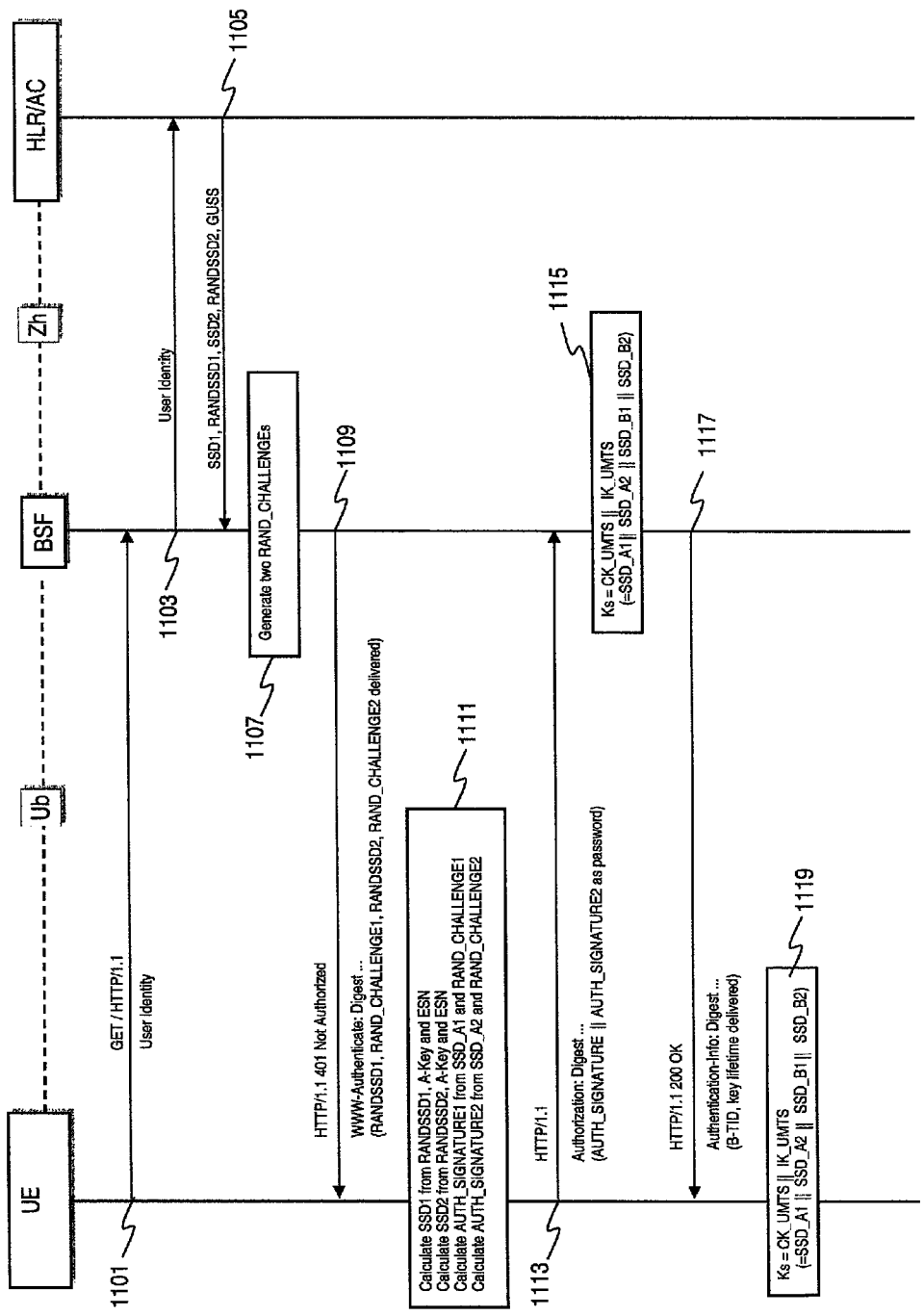
FIG. 11 is a diagram of a bootstrapping procedure utilizing CAVE with HTTP Digest Authentication and Key Agreement Protocol (AKA), according to an embodiment of the invention.

FIG. 11 is a diagram of a bootstrapping procedure utilizing CAVE with HTTP Digest AKA, according to an embodiment of the invention. The message sequence, in this bootstrapping procedure, utilizes two SSDs and two RANDSSDs. The user identity is transmitted, as in step 1101, to the BSF 107 and to the HLR/AC (step 1103). In step 1105, the HLR/AC transmits SSD1, SSD2, RANDSS1, RANDSS2, and GBA user security settings (GUSS) to the BSF 107. In response, the BSF 107 generates two RAND_CHALLENGES (i.e., RAND_CHALLENGE1 and RAND_CHALLENGE2), per step 1107. In step 1109, the RANDSSD1, RANDSSD2, RAND_CHALLENGE1 and RAND_CHALLENGE2 are delivered to the UE.

The UE then calculates the following: SSD1, SSD2, AUTH_SIGNATURE1, and AUTH_SIGNATURE2 (step 1111). SSD1 is computed from RANDSSD1, A-Key and ESN; similarly, SSD2 is determined from RANDSSD2, A-Key and ESN. The AUTH_SIGNATURE1 is calculated from SSD_A1 and RAND_CHALLENGE1; and an AUTH_SIGNATURE2 is calculated from SSD_A2 and RAND_CHALLENGE2. In step 1113, the UE sends the concatenation of AUTH_SIGNATURE1 and AUTH_SIGNATURE2 as the password to the BSF 107.

The key is then generated at the BSF 107, as in step 1115, by concatenating CK_UMTS∥IK_UMTS (=SSD_A1∥SSD_A2∥SSD_B1∥SSD_B2). Also, the BSF 107 sends a 200 OK message specifying the B-TID and key lifetime to the UE (step 1117). In step 1119, the UE determines the Ks.

One of ordinary skill in the art would recognize that the processes for supporting bootstrapping may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 12.

Figure 12:
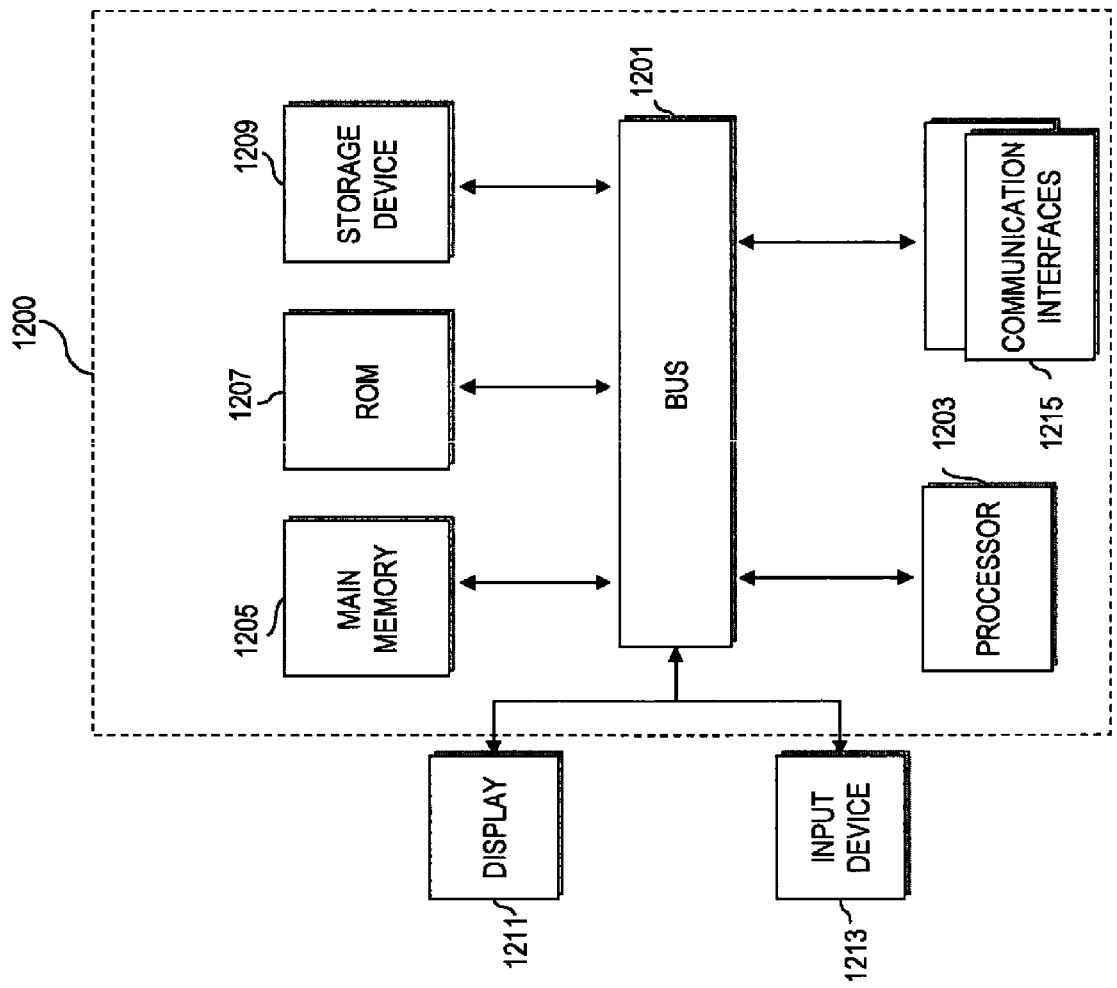
FIG. 12 is a diagram of hardware that can be used to implement various embodiments of the invention.

FIG. 12 illustrates exemplary hardware upon which various embodiments of the invention can be implemented. A computing system 1200 includes a bus 1201 or other communication mechanism for communicating information and a processor 1203 coupled to the bus 1201 for processing information. The computing system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions by the processor 1203. The computing system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computing system 1200 may be coupled via the bus 1201 to a display 1211, such as a liquid crystal display, or active matrix display, for displaying information to a user. An input device 1213, such as a keyboard including alphanumeric and other keys, may be coupled to the bus 1201 for communicating information and command selections to the processor 1203. The input device 1213 can include a cursor control, such as a mouse, a trackball, or cursor direction keys, for communicating direction information and command selections to the processor 1203 and for controlling cursor movement on the display 1211.

According to various embodiments of the invention, the processes described herein can be provided by the computing system 1200 in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1200 also includes at least one communication interface 1215 coupled to bus 1201. The communication interface 1215 provides a two-way data communication coupling to a network link (not shown). The communication interface 1215 sends and receives electrical, electromagnetic, or optical signals that carry digital data streams representing various types of information. Further, the communication interface 1215 can include peripheral interface devices, such as a Universal Serial Bus (USB) interface, a PCMCIA (Personal Computer Memory Card International Association) interface, etc.

The processor 1203 may execute the transmitted code while being received and/or store the code in the storage device 1209, or other non-volatile storage for later execution. In this manner, the computing system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 13A:
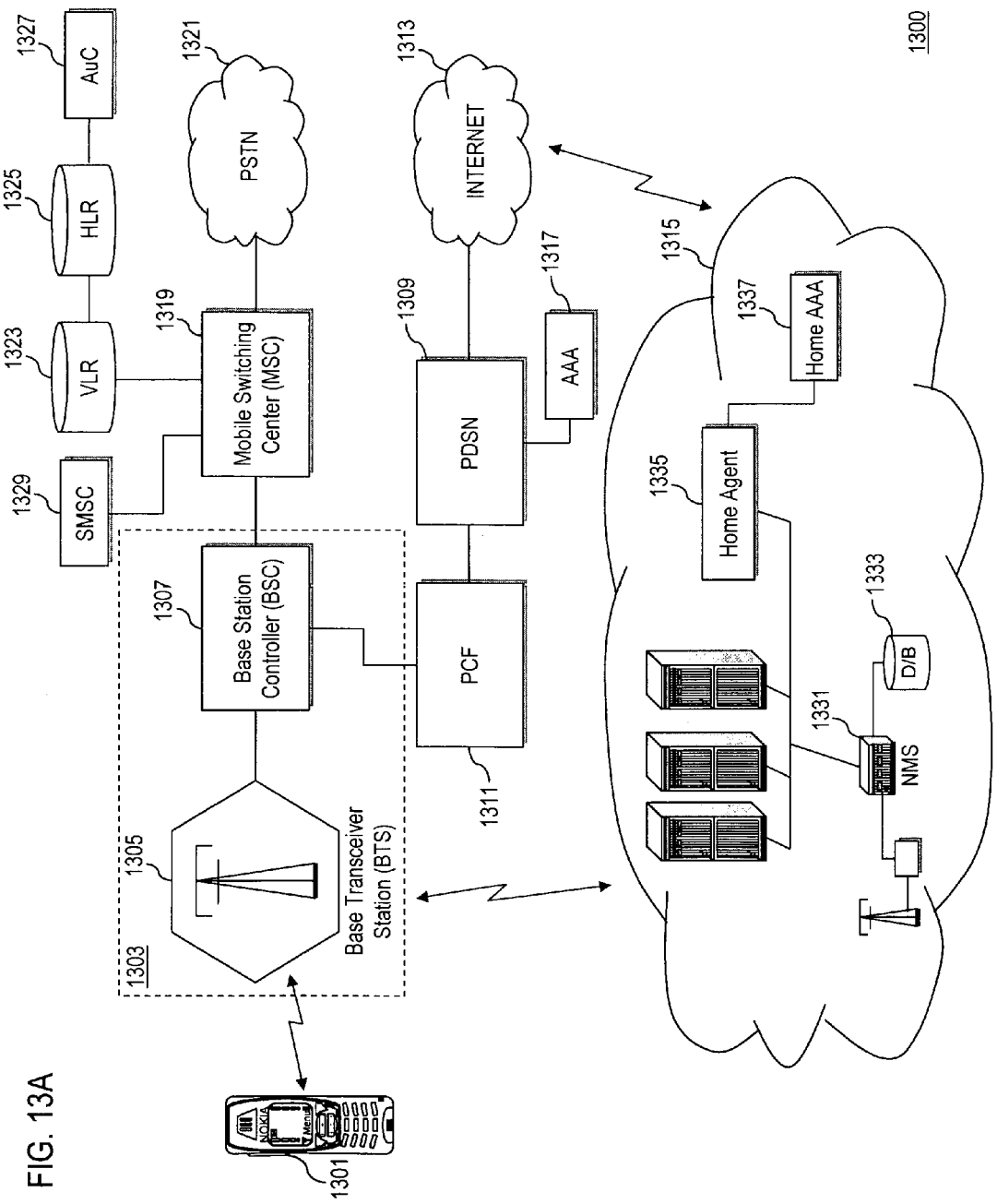
FIGS. 13A and 13B are diagrams of different cellular mobile phone systems capable of supporting various embodiments of the invention.
Figure 13B:
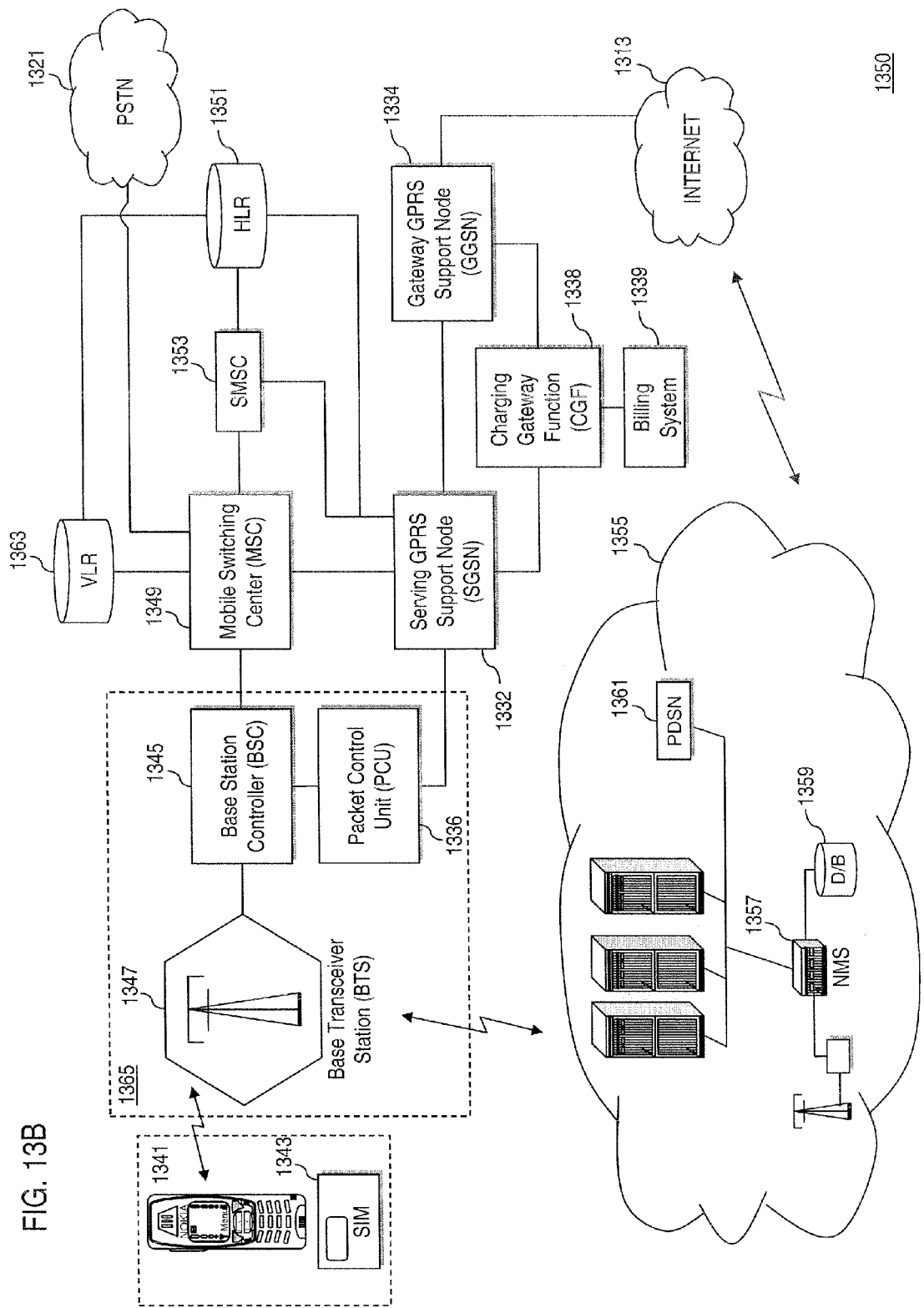

FIGS. 13A and 13B are diagrams of different cellular mobile phone systems capable of supporting various embodiments of the invention. FIGS. 13A and 13B show exemplary cellular mobile phone systems each with both mobile station (e.g., handset) and base station having a transceiver installed (as part of a Digital Signal Processor (DSP)), hardware, software, an integrated circuit, and/or a semiconductor device in the base station and mobile station). By way of example, the radio network supports Second and Third Generation (2G and 3G) services as defined by the International Telecommunications Union (ITU) for International Mobile Telecommunications 2000 (IMT-2000). For the purposes of explanation, the carrier and channel selection capability of the radio network is explained with respect to a cdma2000 architecture. As the third-generation version of IS-95, cdma2000 is being standardized in the Third Generation Partnership Project 2 (3GPP2).

A radio network 1300 includes mobile stations 1301 (e.g., handsets, terminals, stations, units, devices, or any type of interface to the user (such as "wearable" circuitry, etc.)) in communication with a Base Station Subsystem (BSS) 1303. According to one embodiment of the invention, the radio network supports Third Generation (3G) services as defined by the International Telecommunications Union (ITU) for International Mobile Telecommunications 2000 (IMT-2000).

In this example, the BSS 1303 includes a Base Transceiver Station (BTS) 1305 and Base Station Controller (BSC) 1307. Although a single BTS is shown, it is recognized that multiple BTSs are typically connected to the BSC through, for example, point-to-point links. Each BSS 1303 is linked to a Packet Data Serving Node (PDSN) 1309 through a transmission control entity, or a Packet Control Function (PCF) 1311. Since the PDSN 1309 serves as a gateway to external networks, e.g., the Internet 1313 or other private consumer networks 1315, the PDSN 1309 can include an Access, Authorization and Accounting system (AAA) 1317 to securely determine the identity and privileges of a user and to track each user's activities. The network 1315 comprises a Network Management System (NMS) 1331 linked to one or more databases 1333 that are accessed through a Home Agent (HA) 1335 secured by a Home AAA 1337.

Although a single BSS 1303 is shown, it is recognized that multiple BSSs 1303 are typically connected to a Mobile Switching Center (MSC) 1319. The MSC 1319 provides connectivity to a circuit-switched telephone network, such as the Public Switched Telephone Network (PSTN) 1321. Similarly, it is also recognized that the MSC 1319 may be connected to other MSCs 1319 on the same network 1300 and/or to other radio networks. The MSC 1319 is generally collocated with a Visitor Location Register (VLR) 1323 database that holds temporary information about active subscribers to that MSC 1319. The data within the VLR 1323 database is to a large extent a copy of the Home Location Register (HLR) 1325 database, which stores detailed subscriber service subscription information. In some implementations, the HLR 1325 and VLR 1323 are the same physical database; however, the HLR 1325 can be located at a remote location accessed through, for example, a Signaling System Number 7 (SS7) network. An Authentication Center (AuC) 1327 containing subscriber-specific authentication data, such as a secret authentication key, is associated with the HLR 1325 for authenticating users. Furthermore, the MSC 1319 is connected to a Short Message Service Center (SMSC) 1329 that stores and forwards short messages to and from the radio network 1300.

During typical operation of the cellular telephone system, BTSs 1305 receive and demodulate sets of reverse-link signals from sets of mobile units 1301 conducting telephone calls or other communications. Each reverse-link signal received by a given BTS 1305 is processed within that station. The resulting data is forwarded to the BSC 1307. The BSC 1307 provides call resource allocation and mobility management functionality including the orchestration of soft handoffs between BTSs 1305. The BSC 1307 also routes the received data to the MSC 1319, which in turn provides additional routing and/or switching for interface with the PSTN 1321. The MSC 1319 is also responsible for call setup, call termination, management of inter-MSC handover and supplementary services, and collecting, charging and accounting information. Similarly, the radio network 1300 sends forward-link messages. The PSTN 1321 interfaces with the MSC 1319. The MSC 1319 additionally interfaces with the BSC 1307, which in turn communicates with the BTSs 1305, which modulate and transmit sets of forward-link signals to the sets of mobile units 1301.

As shown in FIG. 13B, the two key elements of the General Packet Radio Service (GPRS) infrastructure 1350 are the Serving GPRS Supporting Node (SGSN) 1332 and the Gateway GPRS Support Node (GGSN) 1334. In addition, the GPRS infrastructure includes a Packet Control Unit PCU (1336) and a Charging Gateway Function (CGF) 1338 linked to a Billing System 1339. A GPRS the Mobile Station (MS) 1341 employs a Subscriber Identity Module (SIM) 1343.

The PCU 1336 is a logical network element responsible for GPRS-related functions such as air interface access control, packet scheduling on the air interface, and packet assembly and re-assembly. Generally the PCU 1336 is physically integrated with the BSC 1345; however, it can be collocated with a BTS 1347 or a SGSN 1332. The SGSN 1332 provides equivalent functions as the MSC 1349 including mobility management, security, and access control functions but in the packet-switched domain. Furthermore, the SGSN 1332 has connectivity with the PCU 1336 through, for example, a Fame Relay-based interface using the BSS GPRS protocol (BSSGP). Although only one SGSN is shown, it is recognized that that multiple SGSNs 1332 can be employed and can divide the service area into corresponding routing areas (RAs). A SGSN/SGSN interface allows packet tunneling from old SGSNs to new SGSNs when an RA update takes place during an ongoing Personal Development Planning (PDP) context. While a given SGSN may serve multiple BSCs 1345, any given BSC 1345 generally interfaces with one SGSN 1332. Also, the SGSN 1332 is optionally connected with the HLR 1351 through an SS7-based interface using GPRS enhanced Mobile Application Part (MAP) or with the MSC 1349 through an SS7-based interface using Signaling Connection Control Part (SCCP). The SGSN/HLR interface allows the SGSN 1332 to provide location updates to the HLR 1351 and to retrieve GPRS-related subscription information within the SGSN service area. The SGSN/MSC interface enables coordination between circuit-switched services and packet data services such as paging a subscriber for a voice call. Finally, the SGSN 1332 interfaces with a SMSC 1353 to enable short messaging functionality over the network 1350.

The GGSN 1334 is the gateway to external packet data networks, such as the Internet 1313 or other private customer networks 1355. The network 1355 comprises a Network Management System (NMS) 1357 linked to one or more databases 1359 accessed through a PDSN 1361. The GGSN 1334 assigns Internet Protocol (IP) addresses and can also authenticate users acting as a Remote Authentication Dial-In User Service host. Firewalls located at the GGSN 1334 also perform a firewall function to restrict unauthorized traffic. Although only one GGSN 1334 is shown, it is recognized that a given SGSN 1332 may interface with one or more GGSNs 1334 to allow user data to be tunneled between the two entities as well as to and from the network 1350. When external data networks initialize sessions over the GPRS network 1350, the GGSN 1334 queries the HLR 1351 for the SGSN 1332 currently serving a MS 1341.

The BTS 1347 and BSC 1345 manage the radio interface, including controlling which Mobile Station (MS) 1341 has access to the radio channel at what time. These elements essentially relay messages between the MS 1341 and SGSN 1332. The SGSN 1332 manages communications with an MS 1341, sending and receiving data and keeping track of its location. The SGSN 1332 also registers the MS 1341, authenticates the MS 1341, and encrypts data sent to the MS 1341.

Figure 14:
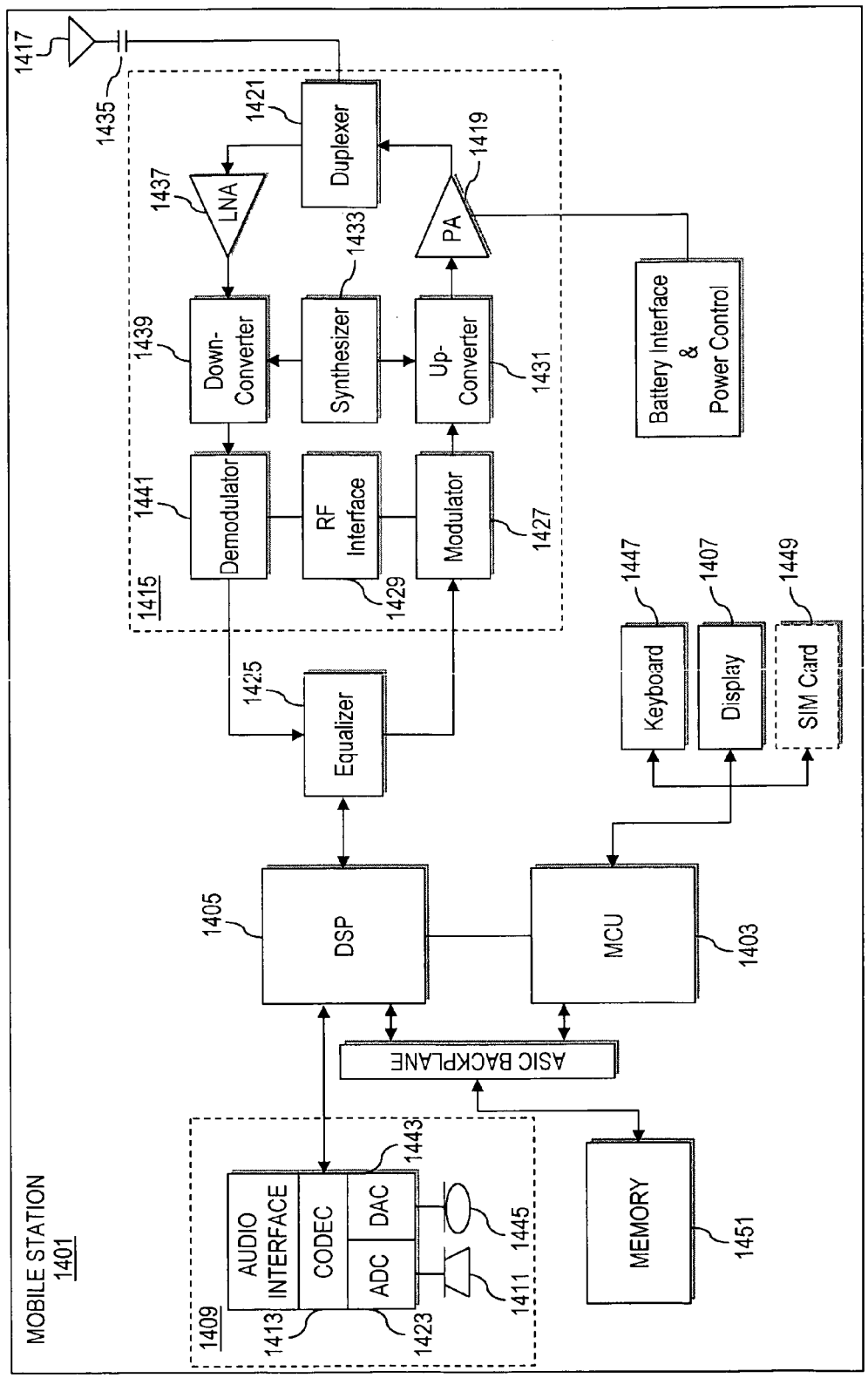
FIG. 14 is a diagram of exemplary components of a mobile station capable of operating in the systems of FIGS. 13A and 13B, according to an embodiment of the invention.

FIG. 14 is a diagram of exemplary components of a mobile station (e.g., handset) capable of operating in the systems of FIGS. 13A and 13B, according to an embodiment of the invention. Generally, a radio receiver is often defined in terms of front-end and back-end characteristics. The front-end of the receiver encompasses all of the Radio Frequency (RF) circuitry whereas the back-end encompasses all of the baseband processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system (e.g., systems of FIG. 13A or 13B), via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System; which is incorporated herein by reference in its entirety.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The MCU 1403 delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

Figure 15:
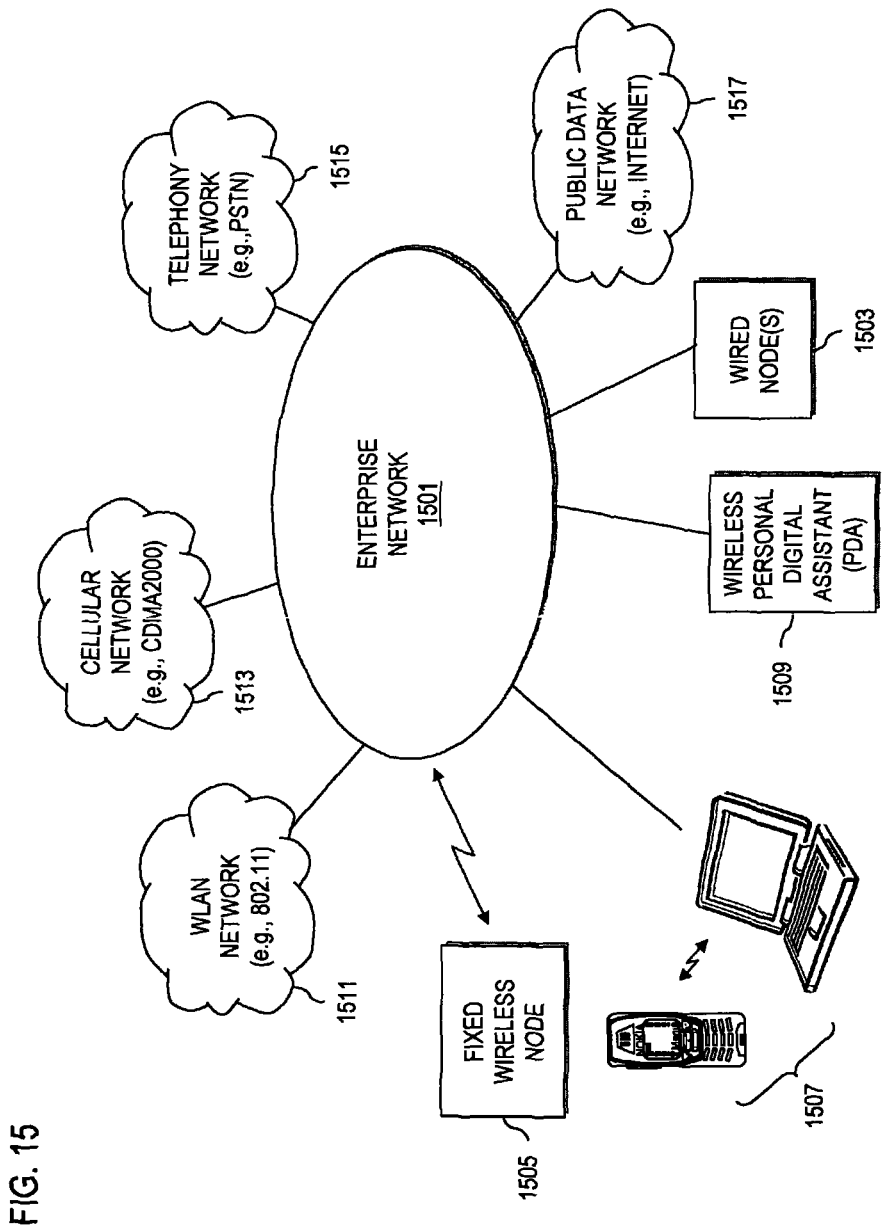
FIG. 15 is a diagram of an enterprise network capable of supporting the processes described herein, according to an embodiment of the invention.

FIG. 15 shows an exemplary enterprise network, which can be any type of data communication network utilizing packet-based and/or cell-based technologies (e.g., Asynchronous Transfer Mode (ATM), Ethernet, IP-based, etc.). The enterprise network 1501 provides connectivity for wired nodes 1503 as well as wireless nodes 1505-1509 (fixed or mobile), which are each configured to perform the processes described above. The enterprise network 1501 can communicate with a variety of other networks, such as a WLAN network 1511 (e.g., IEEE 802.11), a cdma2000 cellular network 1513, a telephony network 1515 (e.g., PSTN), or a public data network 1517 (e.g., Internet).

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    establishing a key with a terminal in a communication network according to a key agreement protocol, wherein the terminal is configured to operate using spread spectrum;
    tying the agreed key to an authentication procedure to provide a security association that supports reuse of the key;
    and generating a master key based on the agreed key;
    wherein the key agreement protocol is performed over a transport security (TLS) tunnel.

2. The method according to claim 1, further comprising:
    generating a challenge message from the agreed key according to the authentication procedure.

3. The method according to claim 1, further comprising:
    generating a challenge message from a key agreement message exchanged with the terminal according to the key agreement protocol.

4. The method according to claim 1, wherein the key agreement protocol includes a Diffie-Hellman key exchange scheme.

5. The method according to claim 4, wherein the terminal is configured to communicate using spread spectrum and to perform bootstrapping according to a generic authentication architecture.

6. The method according to claim 1, wherein the authentication procedure includes a challenge handshake authentication protocol (CHAP).

7. A method for authenticating comprising:
    establishing a shared key with a network element in a communication network according to a key agreement protocol, wherein the network element is configured to tie the agreed key to an authentication procedure to provide a security association that supports reuse of the key;
    and generating a master key based on the agreed key;
    wherein the key agreement protocol is performed over a transport layer security (TLS) tunnel.

8. The method according to claim 7, wherein the key agreement protocol includes a Diffie-Hellman key exchange scheme.

9. The method according to claim 7, further comprising:
    communicating with the network element using Code Division Multiple Access (CDMA);
    and bootstrapping according to a generic authentication scheme.

10. The method according to claim 7, wherein the authentication procedure includes a challenge handshake authentication protocol (CHAP).

11. An apparatus comprising:
    an authentication module configured to establish a shared key with a network element in a communication network according to a key agreement protocol, wherein the agreed key is tied to an authentication procedure to provide a security association that supports reuse of the key, the authentication module being further configured to generate a master key based on the agreed key;
    wherein the key agreement protocol is performed over a transport layer security (TLS) tunnel.

12. The apparatus according to claim 11, wherein the key agreement protocol includes a Diffie-Hellman key exchange scheme.

13. The apparatus according to claim 11, further comprising:
    a transceiver configured to communicate with the network element using spread spectrum, wherein the authentication module being further configured to perform bootstrapping according to a generic authentication architecture.

14. The apparatus according to claim 11, wherein the authentication procedure includes a challenge handshake authentication protocol (CHAP).

* * * * *